United States Patent
Alves et al.

(10) Patent No.: US 7,426,270 B2
(45) Date of Patent: Sep. 16, 2008

(54) METHOD AND SYSTEM FOR CLEAR SIGNAL CAPTURE

(75) Inventors: Rogerio G. Alves, Macomb, MI (US); Kuan-Chieh Yen, Northville, MI (US); Lester Soon Huat Ngia, Troy, MI (US)

(73) Assignee: Clarity Technologies, Inc., Auburn Hills, MI (US)

( * ) Notice: Subject to any disclaimer, the term of this patent is extended or adjusted under 35 U.S.C. 154(b) by 291 days.

(21) Appl. No.: 11/200,575

(22) Filed: Aug. 10, 2005

(65) Prior Publication Data

US 2007/0041575 A1 Feb. 22, 2007

(51) Int. Cl.
*H04M 9/08* (2006.01)
(52) U.S. Cl. .................................. 379/406.08
(58) Field of Classification Search .................. None
See application file for complete search history.

(56) References Cited

U.S. PATENT DOCUMENTS

| | | | | |
|---|---|---|---|---|
| 4,647,790 A | * | 3/1987 | Voorman | 327/179 |
| 5,631,969 A | * | 5/1997 | Hanson | 381/107 |
| 5,644,596 A | | 7/1997 | Sih | |
| 5,680,450 A | | 10/1997 | Dent et al. | |
| 6,351,532 B1 | | 2/2002 | Takada et al. | |
| 6,665,402 B1 | * | 12/2003 | Yue et al. | 379/406.04 |
| 6,687,235 B1 | * | 2/2004 | Chu | 370/286 |
| 6,694,019 B1 | | 2/2004 | Song | |
| 6,813,311 B1 | * | 11/2004 | Pal et al. | 375/219 |
| 7,027,592 B1 | * | 4/2006 | Straussnigg et al. | 379/406.08 |
| 7,260,213 B2 | * | 8/2007 | Stenger | 379/406.07 |
| 2004/0071284 A1 | * | 4/2004 | Abutalebi et al. | 379/406.08 |
| 2005/0047609 A1 | | 3/2005 | Buchner et al. | |

FOREIGN PATENT DOCUMENTS

WO WO 2004064366 A1 * 7/2004

OTHER PUBLICATIONS

R. Martin, J. Altenhoner, "Coupled Adaptive Filters for Acoustic Echo Control and Noise Reduction," *Proc. ICASSP 95*, pp. 3043-3046, May 1995.
A. Stenger and W. Kellermann, "Adaptation of a Memoryless Preprocessor for Nonlinear Acoustic Echo Cancelling," In *Signal Processing*, vol. 80, pp. 1747-1760, Elsevier, Sep. 2000.
J. Sjöberg and L. S. H. Ngia, *Nonlinear Modeling, Advanced Black-Box Techniques*, chapter "Some Aspects of Neural Nets and Related Model Structures for Nonlinear System Identification," pp. 1-28, Kluwer Academic Publisher, 1998.

* cited by examiner

*Primary Examiner*—Ramnandan Singh
(74) *Attorney, Agent, or Firm*—Brooks Kushman P.C.

(57) ABSTRACT

A method and system for clear signal capture comprehend several individual aspects that address specific problems in improved ways. In addition, the method and system also comprehend a hands-free implementation that is a practical solution to a very complex problem.

24 Claims, 10 Drawing Sheets

(a)

(b)

METHOD AND SYSTEM FOR CLEAR SIGNAL CAPTURE

BACKGROUND OF THE INVENTION

1. Field of the Invention

The invention relates to a method and system for capturing signals and to associated signal processing techniques. This invention further relates to a method and system for hands free operation of mobile or non-mobile phones.

2. Background Art

In any system for capturing signals, the goal is to capture the desired signal while rejecting undesired signals. Signal processing techniques are employed to process a received input signal to enhance the desired signal while removing the undesired signals.

One particular problem faced in systems for hands free operation of mobile or non-mobile phones is the acoustic echo cancellation (AEC) problem. The AEC problem is a well known problem, and it can be described as shown in FIG. 1, where the far-end received signal (x(n)) is sent to a loud speaker inside of a car (for example). This signal is propagated by the interior of the automobile through the acoustic path (q(n)), and is fed back into the microphone generating the echo signal (c(n)). To cancel the echo signal an adaptive filter is used, where the objective is to identify the acoustic echo path (q(n)) with the adaptive filter (g(n)), and then to subtract the resultant signal (y(n)) from the microphone signal. If (g(n)=q(n)) then (y(n)=c(n)), and the subtraction of the output signal of the adaptive filter from the microphone signal will cancel the echo signal.

This AEC problem has been addressed in existing applications by using different types of adaptive filter algorithms such as least mean square algorithm (LMS), normalized least mean square algorithm (NLMS), data reuse normalized least mean square algorithm (DRNLMS), recursive least square algorithm (RLS), affine projection algorithm (APA), and others.

Another related problem is that an adaptive filter algorithm needs some type of control to prevent the divergence of the algorithm when far-end send and near-end receive signals are present at the same time.

This divergence problem has been addressed in existing applications by introducing a double talk detector (DTD). The DTD restricts the conditions under which the adaptive filter algorithm may adapt.

One particular requirement of any system is that the system must perform well in the presence of a noise signal (v(n)). In attempts to meet this requirement, a noise cancellation algorithm (NC) has been introduced. Various different approaches have been taken for implementing the NC algorithm including approaches based on spectral subtraction, Kalman filters, neural networks, and others.

In another aspect, existing applications have introduced a nonlinear processor (NLP). The NLP attempts to compensate for the practical problem of the adaptive filter algorithm not achieving its minimum mean square error (MSE) and for system nonlinearity particularly where one of the sources is the nonlinear loud speaker.

Overall, existing applications have taken a variety of approaches to address acoustic echo, adaptive algorithm divergence, noise, and system nonlinearity. The initial problem of acoustic echo cancellation has developed into an evolving complex problem involving a number of different design aspects. Although various approaches have been taken in addressing specific issues, the overall evolving complex problem has yet to be fully addressed.

Background information may be found in S. Haykin, *Adaptive Filter Theory*, Prentice Hall, Upper Saddle River, N.J., 4th Edition, 2002; P. S. R. Diniz, *Adaptive Filtering—Algorithms and Practical Implementation*, Kluwer Academic Publishers, Dordrecht, The Netherlands, 2nd Edition, 2002; P. P. Vaidyanathan, *Multirate Systems and Filter Banks*, Prentice Hall Signal Processing Series, Englewood Cliffs, N.J., 1993; R. E. Crochiere, L. R. Rabiner, *Multirate Digital Signal Processing*, Prentice Hall, Englewood Cliffs, N.J.; S. T. Gay, J. Benesty, *Acoustic Signal Processing for Telecommunication*, Kluwer Academic Publishers, Dordrecht, The Netherlands, 2000; S. F. Boll, "Suppression of acoustic noise in speech using spectral subtraction," *IEEE Trans. Acoust., Speech, Signal Proc.*, vol. ASSP-27, Apr. 1979; R. B. Jeannes, P. Scalart, G. Faucon, C. Beaugeant, "Combined noise and echo reduction in hands free systems: A survey," *IEEE Trans. Speech Audio Processing*, vol. 9, pp 808-820, November 2001; R. Martin, J. Altenhoner, "Coupled Adaptive Filters for Acoustic Echo Control and Noise Reduction," *Proc. ICASSP 95*, pp. 3043-3046, May 1995; M. R. Petraglia, R. G. Alves, P. S. R. Diniz, "New Structures for Adaptive Filtering in Subbands with Critical Sampling," *IEEE Transactions on Signal Processing*, Vol. 48, No. 12, December 2000; M. R. Petraglia, R. G. Alves, P. S. R. Diniz, "Convergence Analysis of an Oversampled Subband Adaptive Filtering Structure with Local Errors," *Proc. IEEE Int. Symp. on Circuits and Systems (ISCAS)*, May 2000.

Further, background information may be found in A. Stenger and W. Kellermann, "Adaptation of a Memoryless Preprocessor for Nonlinear Acoustic Echo Cancelling," *In Signal Processing, vol.* 80, pp. 1747-1760, Elsevier, September, 2000; J. Sjöberg and L. S. H. Ngia, *Nonlinear Modeling, Advanced Black-Box Techniques*, chapter "Some Aspects of Neural Nets and Related Model Structures for Nonlinear System Identification," pages 1-28, Kluwer Academic Publisher, 1998; and J. E. Dennis and R. B. Schnabel, *Numerical Methods for Unconstrained Optimization and Nonlinear Equations*, Prentice-Hall, Englewood Cliffs, N.J., 1983.

For the foregoing reasons, there is a need for an improved method and system for clear signal capture that provides a practical solution to this evolving complex problem.

SUMMARY OF THE INVENTION

It is an object of the invention to provide an improved method and system for clear signal capture. The improved method and system comprehend several individual aspects that address specific problems in improved ways. In addition, the improved method and system also comprehend a hands free implementation that is a practical solution to a very complex problem.

The invention comprehends five different nonlinear processing approaches. These approaches include an asymmetric nonlinear adaptive filter (ANLAF), a frequency dependent nonlinear processor (FD_NLP), a step size control to improve the nonlinear processing (SSC_NLP), a virtual state machine (VSM) and a dynamic nonlinear compensation (DNLC). In real applications, depending on the type of the nonlinearity, the necessary parts of the nonlinear package can be used to achieve the desired performance of the system.

In one aspect of the invention, a method of acoustic echo cancellation (AEC) is provided. A microphone signal resulting from an unobservable signal corrupted by both additive background noise and an acoustic echo is processed in an attempt to restore the unobservable signal. The acoustic echo is a speaker signal modified by an acoustic path. An adaptive filter models the echo path. The method comprises receiving the microphone signal, and applying a first asymmetric nonlinear adaptive filter in fullband to the speaker signal to produce a first output signal. A first adaptive filter in fullband is applied to the first output signal to produce a first echo signal that models the acoustic echo. The first echo signal is subtracted from the microphone signal to produce a first echoless signal that resembles the unobservable signal. The first nonlinear adaptive filter in fullband and the adaptive filter are adapted based on the first echoless signal.

The asymmetric nonlinear adaptive filter approach determines if the system has nonlinearity such hard clip on the power amplifier of the loud speaker or soft clip at the loud speaker. After identifying the nonlinearity, adequate compensation is introduced on the system automatically.

In another aspect of the invention, a residual echo reduction filter is applied to the frequency domain echoless signal. An average bandwidth attenuation factor is determined based on the coefficients of the residual echo reduction filter. Further, in this approach, a threshold is determined, and when the average bandwidth attenuation factor is less than the threshold, a frequency dependent nonlinear attenuation vector is applied to a defined group of frequency bands. This frequency dependent nonlinear processing is based on different effectiveness of the acoustic echo cancellation system in different frequencies.

In another aspect of the invention, the step size of the adaptive algorithm is increased so that the system can escape from local minima and reach the global minimum. These local minima may be generated by nonlinearities and could potentially trap adaptive filter algorithms. According to this aspect of the invention, a classification of near-end and far-end speeches to detect a significant nonlinear relationship between near-end and far-end speeches is made. In the event that a significant nonlinear relationship is detected, the adaptation rate of the adaptive filter in frequency domain is increased to escape local minima and approach the global minimum.

Further, in another aspect of the invention, state differentiators that are utilized to preserve the high quality performance of the system. In this approach, a residual echo reduction filter is applied to the frequency domain echoless signal. State differentiators are utilized to make a classification of near-end and far-end speeches to detect a significant nonlinear relationship between near-end and far-end speeches. In the event that a significant nonlinear relationship is detected, the residual echo reduction filter is modified to provide additional attenuation to the residual echo relative to the extent of attenuation provided in the absence of significant nonlinearity.

Further, in another aspect of the invention, dynamic nonlinear compensation is provided. In cases where the volume information is given to the system, and the operational range of the volume is in the nonlinear range of the power amplifier or the loud speaker, a compensation of this nonlinearity can be made at the reference signal. In this approach, additional nonlinear processing can be avoided, but the volume information of the system has to be known a priori. According to this aspect of the invention, prior to the input of the adaptive filter, a nonlinear compensation sealed by volume information of the system, with this dynamic nonlinear pre-distortion the system can be treated as a linear system.

DETAILED DESCRIPTION OF THE PREFERRED EMBODIMENT

Figure 2:
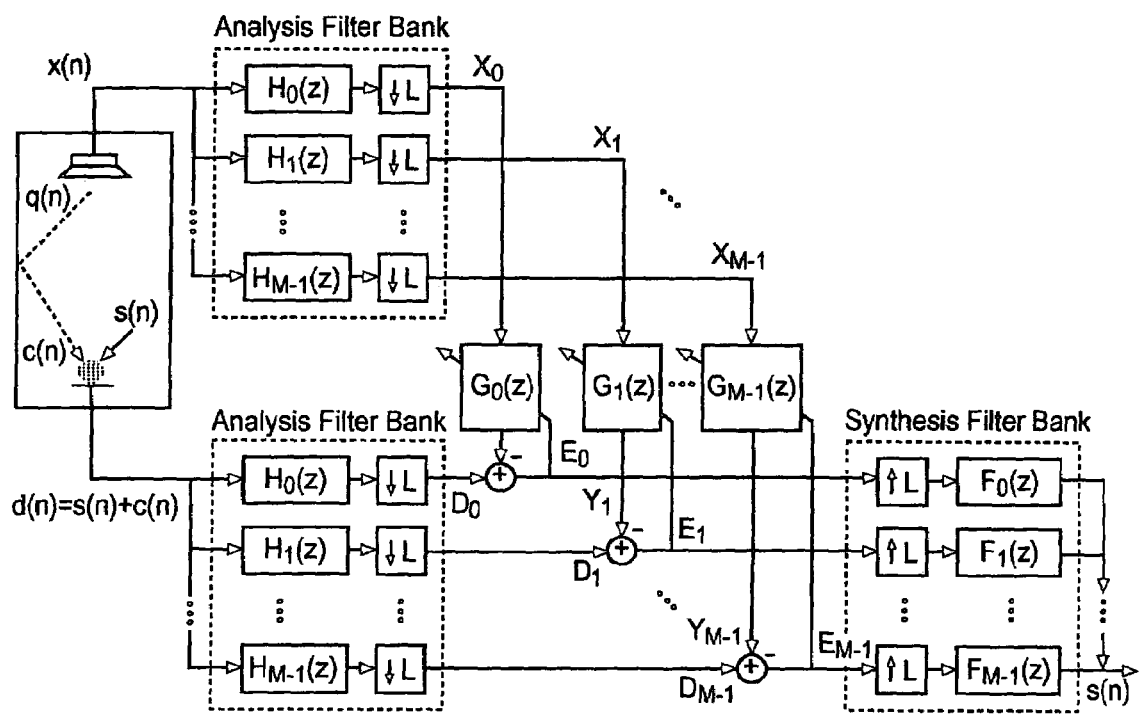
FIG. 2 illustrates a subband adaptive filter structure.
Figure 3:
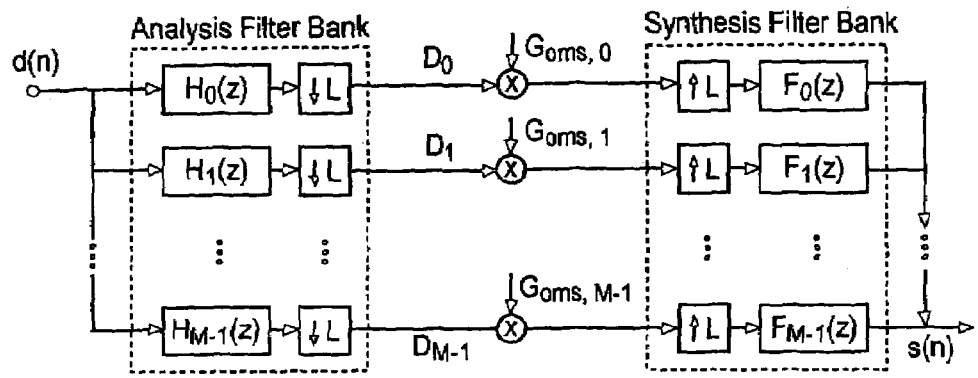
FIG. 3 illustrates a noise cancellation algorithm.

FIG. 2 illustrates a subband adaptive filter structure. The adaptive filter algorithm used is the second-order DRNLMS in the frequency domain. The noise cancellation algorithm is illustrated in FIG. 3, and is also implemented in the frequency domain. In this way, both the speaker and microphone signals are split into frequency subbands, the AEC and NC are implemented in frequency domain, and the output signal is transformed back to the time domain.

With continuing reference to FIG. 2, the subband adaptive filter structure used to implement the NLMS in subbands consists of two analysis filter banks, which split the speaker (x(n)) and microphone (d(n)) signals into M bands each. The subband signals are modified by an adaptive filter, after being decimated by a factor L, and the coefficients of each subfilter ($G_i$) are adapted independently using the individual error signal of the corresponding band ($E_i$). In order to avoid aliasing effects, this structure uses a down-sampling factor L smaller than the number of subbands M. The analysis and synthesis filter banks can be implemented by uniform DFT filter banks, so that the analysis and synthesis filters are shifted versions of the low-pass prototype filters, i.e.

$$H_i(z) = H_0(z W_M^i)$$

$$F_i(z) = F_0(z W_M^i)$$

with i=0, 1, . . . ,M-1, where $H_0(z)$ and $F_0(z)$ are the analysis and synthesis prototype filters, respectively, and $$W_M = e^{-j\frac{2\pi}{M}}.$$

Uniform filter banks can be efficiently implemented by the Weighted Overlap-Add (WOA) method.

The coefficient update equation for the subband structure of FIG. 2, based on the NLMS algorithm, is given by:

$$\underline{G}_i(k+1) = \underline{G}_i(k) + \mu_i(k)[\underline{X}_i^*(k)E_i(k)]$$

where '*' represents the conjugate value of $\underline{X}_i(k)$, and:

$$E_i(k) = D_i(k) - Y_i(k)$$
$$Y_i(k) = \underline{X}_i^T(k)\underline{G}_i(k)$$
$$\mu_i(k) = \frac{\mu}{P_i(k)}$$

are the error signal, the output of the adaptive filter and the step-size in each subband, respectively.

Note that the step size appears normalized by the power of the reference signal. Note also that $\mu$ is a constant real value, and $P_i(k)$ is the power estimate of the reference signal $X_i(k)$, which can be obtained recursively by the equation:

$$P_i(k+1) = \beta P_i(k) + (1-\beta)|X_i(k)|^2$$

for $0 < \beta < 1$.

A few observations of the illustrated subband adaptive filter can be made. If the system to be identified has N coefficients in fullband, each subband adaptive filter ($\underline{G}_i(k)$) will be a column vector with N/L complex coefficients, as well as $\underline{X}_i(k)$. $D_i(k)$, $X_i(k)$, $Y_i(k)$ and $E_i(k)$ are complex numbers. The choice of N is related to the tail length of the echo signal to cancel, for example, if fs=8 kHz, and the desired tail length is 64 ms, N=8000*0.064=512 coefficients, for the time domain fullband adaptive filter. $\beta$ is related to the number of coefficients of the adaptive filter ((N−L)/N). The number of subbands for real input signals is M=(Number of FFT points)/2+1.

The previous equations describe the NLMS in subband, to obtain the DRNLMS it is required to compute the "new" error signal ($E_i(k)$) using the updated values of the subband adaptive filter coefficients, and to update again the coefficients of the subband adaptive filters, it is:

$$Y_i^j(k) = \underline{X}_i^T(k)\underline{G}_i^{j-1}(k)$$
$$E_i^j(k) = D_i(k) - Y_i^j(k)$$
$$\mu_i^j(k) = \frac{\mu^j}{P_i(k)}$$
$$\underline{G}_i^j(k) = \underline{G}_i^{j-1}(k) + \mu_i^j(k)[\underline{X}_i^*(k)E_i^j(k)]$$

where j=2, ... R represents the number of reuses that are in the algorithm, also known as order of the algorithm. Observe that $$\underline{G}_i^1(k) = \underline{G}_i(k) \mu_i^1(k) = \mu_i(k) \; E_i^1(k) = E_i(k)$$

and $$Y_i^1(k) = Y_i(k)$$

With continuing reference to FIG. 3, the noise cancellation algorithm considers that a speech signal s(n) is corrupted by additive background noise v(n), so the resulting noisy speech signal d(n) can be expressed as $$d(n) = s(n) + v(n).$$

Ideally, the goal of the noise cancellation algorithm is to restore the unobservable s(n) based on d(n). Unlike the AEC problem, where what needs to be removed from the microphone signal is unambiguous, the noise cancellation problem is usually not as well defined. For the purpose of this noise cancellation algorithm, the background noise is defined as the quasi-stationary noise that varies at a much slower rate compared to the speech signal.

The noise cancellation algorithm is a frequency-domain based algorithm. With a DFT analysis filter bank with length (2M−2) DFT, the noisy signal d(n) is split into M subband signals, $D_i(k)$, i=0,1. . . , M−1, with the center frequencies uniformly spaced from DC to Nyquist frequency. Except the DC and the Nyquist bands (bands 0 and M−1, respectively), all other subbands have equal bandwidth which equals to 1/(M−1) of the overall effective bandwidth. In each subband, the average power of quasi-stationary background noise is tracked, and then a gain is decided accordingly and applied to the subband signals. The modified subband signals are subsequently combined by a DFT synthesis filter bank to generate the output signal. When combined with other frequency-domain modules (AEC for example), the DFT analysis and synthesis banks are moved to the front and back of all modules, respectively.

Because it is assumed that the background noise varies slowly compared to the speech signal, its power in each subband can be tracked by a recursive estimator $$P_{NZ,i}(k) = (1 - \alpha_{NZ})P_{NZ,i}(k-1) + \alpha_{NZ}|D_i(k)|^2$$
$$= P_{NZ,i}(k-1) + \alpha_{NZ}(|D_i(k)|^2 - P_{NZ,i}(k-1))$$

where the parameter $\alpha_{NZ}$ is a constant between 0 and 1 that decides the weight of each frame, and hence the effective average time. The problem with this estimation is that it also includes the power of speech signal in the average. If the speech is not sporadic, significant over-estimation can result. To avoid this problem, a probability model of the background noise power is used to evaluate the likelihood, that the current frame has no speech power in the subband. When the likelihood is low, the time constant $\alpha_{NZ}$ is reduced to drop the influence of the current frame in the power estimate. The likelihood is computed based on the current input power and the latest noise power estimate:

$$L_{NZ,i}(k) = \frac{|D_i(k)|^2}{P_{NZ,i}(k-1)} \exp\left(1 - \frac{|D_i(k)|^2}{P_{NZ,i}(k-1)}\right)$$

and the noise power is estimated as $$P_{NZ,i}(k) = P_{NZ,i}(k-1) + (\alpha_{NZ}L_{NZ,i}(k))(|D_i(k)|^2 - P_{NZ,i}(k-1)).$$

It can be observed that $L_{NZ,i}(k)$ is between 0 and 1. It reaches 1 only when $|D_i(k)|^2$ is equal to $P_{NZ,i}(k-1)$, and reduces towards 0 when they become more different. This allows smooth transitions to be tracked but prevents any dramatic variation from affecting the noise estimate.

In practice, less constrained estimates are computed to serve as the upper- and lower-bounds of $P_{NZ,i}(k)$. When it is detected that $P_{NZ,i}(k)$ is no longer within the region defined by the bounds, it is adjusted according to these bounds and the adaptation continues. This enhances the ability of the algorithm to accommodate occasional sudden noise floor changes, or to prevent the noise power estimate from being trapped due to inconsistent audio input stream.

In general, it can be assumed that the speech signal and the background noise are independent, and thus the power of the microphone signal is equal to the power of the speech signal plus the power of background noise in each subband. The power of the microphone signal can be computed as $|D_i(k)|^2$. With the noise power available, an estimate of the speech power is $$P_{SP,i}(k)=\max(|D_i(k)|^2-P_{NZ,i}(k),0)$$

and therefore, the optimal Wiener filter gain can be computed as $$G_{T,i}(k) = \max\left(1 - \frac{P_{NZ,i}(k)}{|D_i(k)|^2}, 0\right).$$

However, since the background noise is a random process, its exact power at any given time fluctuates around its average power even if it is stationary. By simply removing the average noise power, a noise floor with quick variations is generated, which is often referred to as musical noise or watery noise. This is the major problem with algorithms based on spectral subtraction. Therefore, the instantaneous gain $G_{T,i}(k)$ needs to be further processed before being applied.

When $|D_i(k)|^2$ is much larger than $P_{NZ,i}(k)$, the fluctuation of noise power is minor compared to $|D_i(k)|^2$, and hence $G_{T,i}(k)$ is very reliable. On the other hand, when $|D_i(k)|^2$ approximates $P_{NZ,i}(k)$, the fluctuation of noise power becomes significant, and hence $G_{T,i}(k)$ varies quickly and is unreliable. In accordance with an aspect of the invention, more averaging is necessary in this case to improve the reliability of gain factor. To achieve the same normalized variation for the gain factor, the average rate needs to be proportional to the square of the gain. Therefore the gain factor $G_{oms,i}(k)$ is computed by smoothing $G_{T,i}(k)$ with the following algorithm:

$$G_{oms,i}(k)=G_{oms,i}(k-1)+(\alpha_G G_{0,i}^2(k)(G_{T,i}(k)-G_{oms,i}(k-1)) \; G_{0,i}(k)=G_{oms,i}(k-1)+0.25\times(G_{T,i}(k)-G_{oms,i}(k-1))$$

where $\alpha_G$ is a time constant between 0 and 1, and $G_{0,i}(k)$ is a pre-estimate of $G_{oms,i}(k)$ based on the latest gain estimate and the instantaneous gain. The output signal can be computed as $$\hat{S}_i(k)=G_{oms,i}(k)\times D_i(k).$$

It can be observed that $G_{oms,i}(k)$ is averaged over a long time when it is close to 0, but is averaged over a shorter time when it approximates 1. This creates a smooth noise floor while avoiding generating ambient speech.

Figure 4:
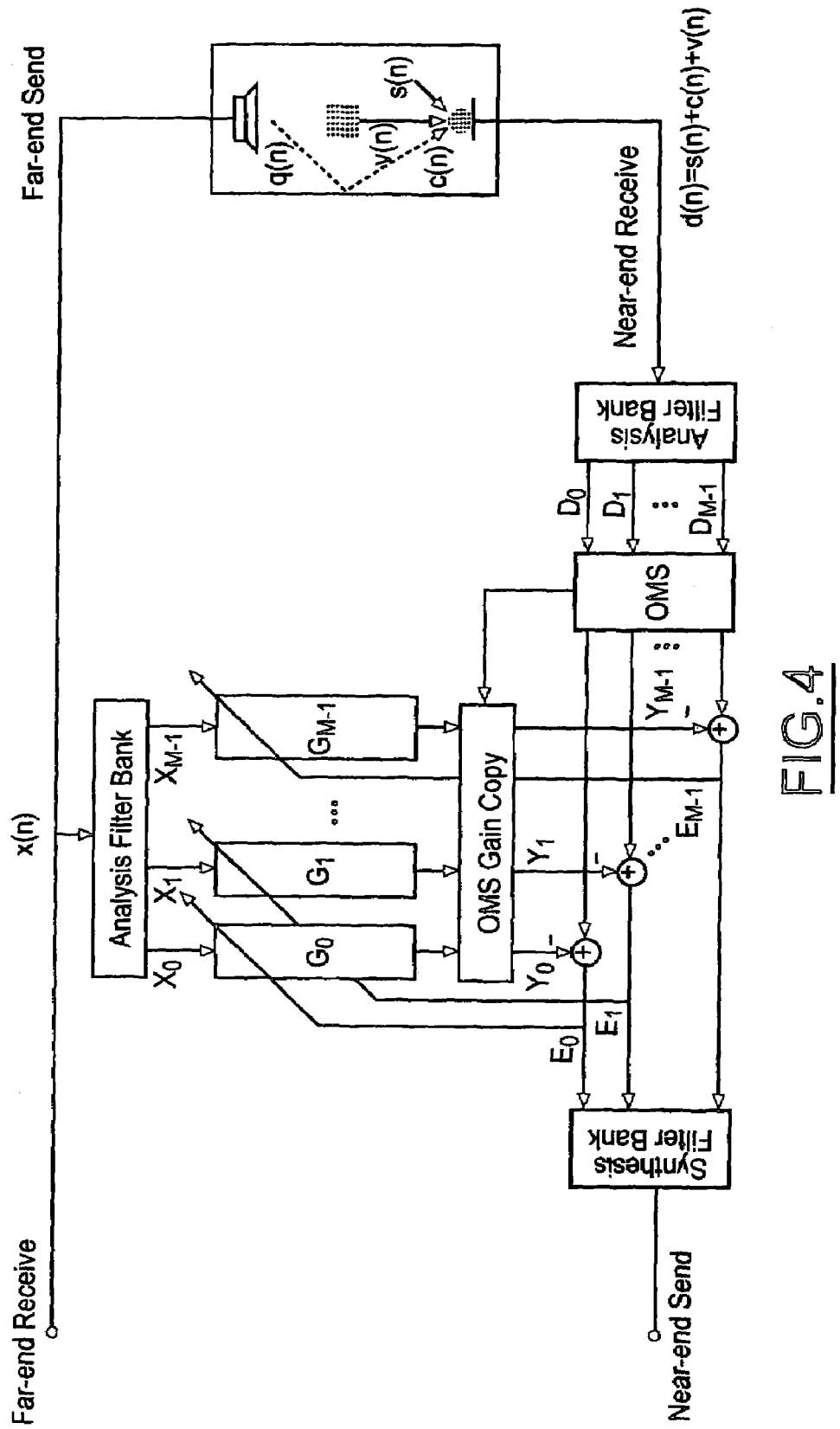
FIG. 4 illustrates an arrangement that optimizes the AEC algorithm performance.

FIG. 4 illustrates the subband adaptive filter structure and the noise cancellation algorithm arranged to optimize AEC performance.

Figure 1:
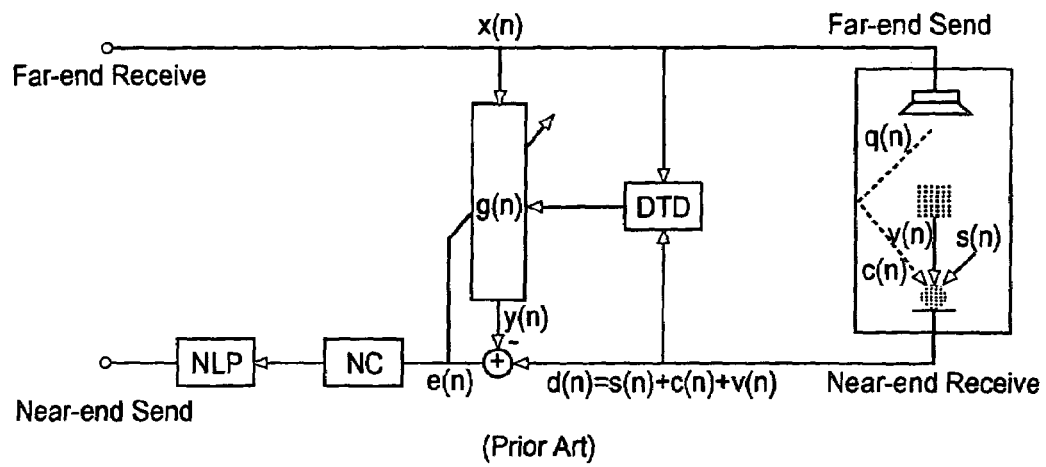
FIG. 1 illustrates a prior art hands free implementation.

Considering the prior art system shown in FIG. 1, the adaptive filter algorithm comes first and the noise cancellation implementation follows. It is realized in this way because historically the adaptive filter algorithm is realized in time domain, and the noise cancellation algorithm is realized in frequency domain. Changing the order of the adaptive filter and the noise cancellation algorithms would introduce a delay at the microphone signal path caused by the NC algorithm and would also introduce a nonlinearity caused by the NC algorithm. The adaptive filter cannot compensate nonlinearity (because it is a linear system (FIR filter)).

The arrangement of FIG. 4 overcomes these limitations by implementing the NC algorithm first and then the adaptable filter algorithm second. In this way, environmental noise is removed and the convergence rate of the adaptive filter algorithm and also the maximum echo return loss enhancement (ERLE) obtained by the system will be increased.

By placing a copy of the OMS gain coefficients at the output of the subband adaptive filters, the nonlinearity introduced by the OMS gain coefficients at the microphone input is compensated. In addition, by implementing the subband adaptive filter structure and noise cancellation algorithm in the frequency domain, time delay problems can be avoided.

Figure 5:
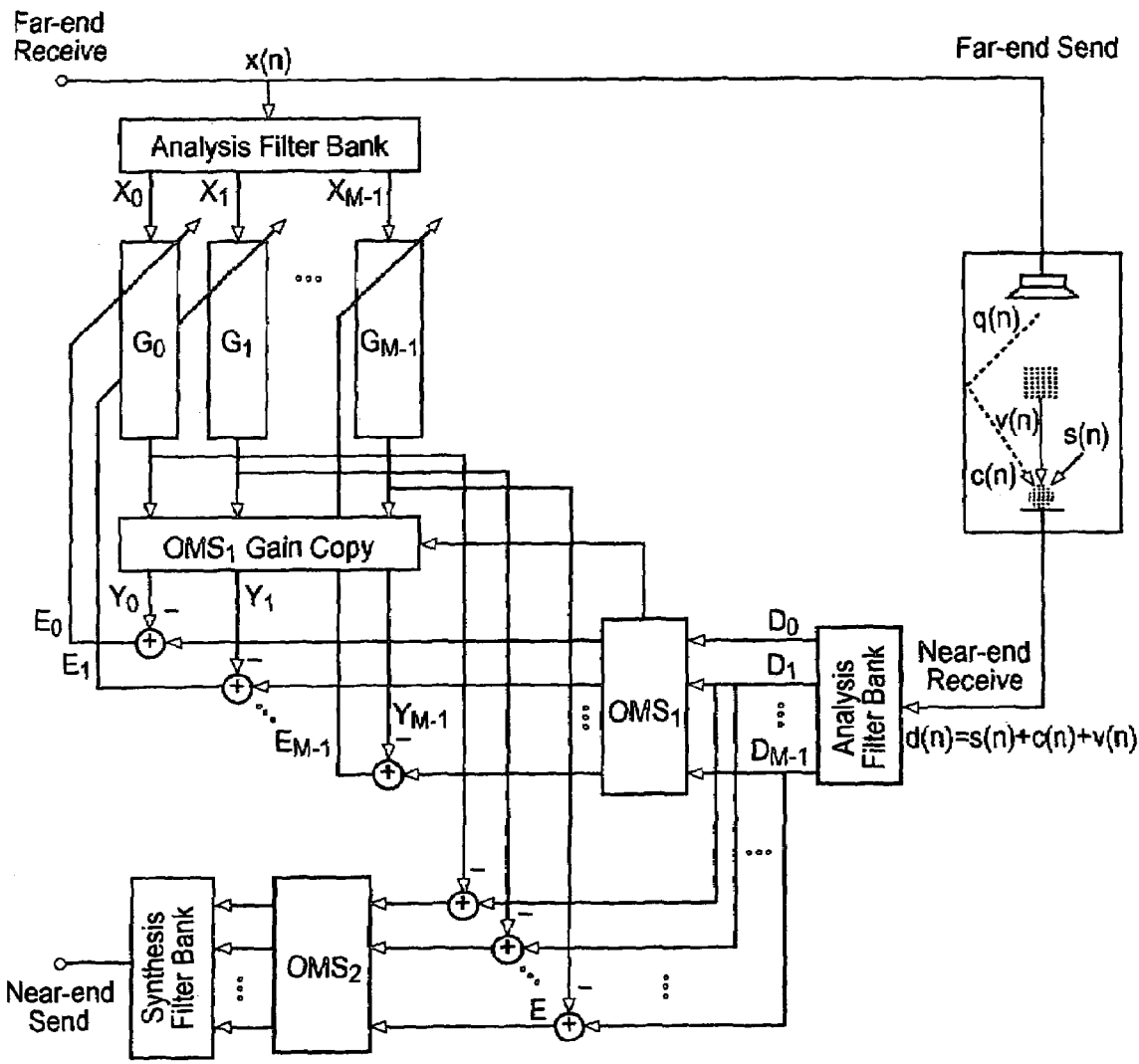
FIG. 5 illustrates an arrangement that optimizes the AEC and NC algorithms performance.

FIG. 5 illustrates the subband adaptive filter structure and the noise cancellation algorithm arranged to optimize AEC and NC performance. FIG. 4 illustrates the AEC improvement achieved by placing the NC algorithm before the AEC algorithm, but from the NC algorithm point of view, the NC algorithm could perform better if applied after removal of the echo. The FIG. 5 arrangement optimizes both algorithms at the same time. As shown, a second NC algorithm ($OMS_2$ block) is performed in an echoless signal. That is, the adaptive filter benefits from the presence of the $OMS_1$, and $OMS_1$, copy blocks while the $OMS_2$ block benefits from the adaptive filter. In this way, the output from the $OMS_2$ block benefits significantly in terms of AEC and NC performance.

From the acoustic model illustrated in FIG. 5, the microphone signal d(n) can be decomposed as $$d(n)=d_{ne}(n)+d_{fe}(n)$$

where the near-end component $d_{ne}(n)$ is the sum of the near-end speech s(n) and background noise v(n), and the far-end component $d_{fe}(n)$ is the acoustic echo, which is the speaker signal modified by the acoustic path: $c(n)=q(n)\otimes x(n)$. The NLMS filter estimates the acoustic path by matching the speaker signal (x(n)) to the microphone signal (d(n)) through correlation. Because it is assumed that both near-end speech and background noise are uncorrelated to the reference signal, the adaptive filter should converge to the acoustic path q(n).

However, since the NLMS is a gradient-based adaptive algorithm that approximates the actual gradients by single samples, the filter coefficients drift around the ideal solutions even after the filter converges. The range of drifting, or misadjustment, depends mainly on two factors: adaptation gain constant µ and the energy ratio between near-end and far-end components.

The misadjustment plays an important role in AEC performance. When near-end speech or background noise is present, this increases the near-end to far-end ratio, and hence increases the misadjustment. Thus the filter coefficients drift further away from the ideal solution, and the residual echo becomes louder as a result. This problem is usually referred to as divergence.

Traditional AEC algorithms deal with the divergence problem by deploying a state machine that categorizes the current event into one of four categories: silence (neither far-end nor near-end speech present), receive-only (only far-end speech present), send-only (only near-end speech present), and double-talk (both far-end and near-end speech present). By adapting filter coefficients during the receive-only state and halting adaptation otherwise, the traditional AEC algorithm prevents divergence due to the increase in near-end to far-end ratio. Because the state machine is based on the detection of voice activities at both ends, this method is often referred to as double-talk detection (DTD).

Although working nicely in many applications, the DTD inherits two fundamental problems. First of all, it completely ignores the near-end background noise as a factor. Secondly, it only allows filter adaptation in the receive-only state, and thus cannot handle any echo path variation during other states. The DTD can get away with these problems when the background noise level is ignorable and the near-end speech is sporadic. However, when background noise becomes significant, not only the accuracy of state detection suffers, the balance between dynamic tracking and divergence prevention also becomes difficult. Therefore, a lot of tuning effort is necessary for a traditional DTD-based system, and system robustness is often a problem.

Furthermore, the traditional DTD-based system often manipulates the output signal according to the detected state in order to achieve better echo reduction. This often results in half-duplex like performance in noisy conditions.

To overcome the deficiency of the traditional DTD, a more sophisticated double-talk control is used in order to achieve better overall AEC performance. As discussed above, the misadjustment mainly depends on two factors: adaptation gain constant and near-end to far-end ratio. Therefore, using adaptation gain constant as a counter-balance to the near-end to far-end ratio can keep the misadjustment at a constant level and thus reduce divergence. To achieve this, it is necessary that $$\mu \propto \left(\frac{\text{far} - \text{end energy}}{\text{total energy}}\right)^2 = \left(\frac{E\{|d_{fe}(n)|^2\}}{E\{|d(n)|^2\}}\right)^2.$$

When there is no near-end component, the filter adaptation is allowed to proceed at full speed. As the near-end to far-end ratio increases, the filter adaptation slows down accordingly. Finally, when there is no far-end component, the filter adaptation is halted since there is no information about the echo path available. Theoretically, this strategy achieves optimal balance between dynamic tracking ability and filter divergence control. Furthermore, because the adaptive filter in each subband is independent from the filters in other subbands, this gain control decision can be made independent in each subband and becomes more efficient.

The major obstacle of this strategy is the availability of the far-end (or equivalently, near-end) component. With access to these components, there would be no need for an AEC system. Therefore, an approximate form is used in the adaptation gain control:

$$\mu_i \frac{|E\{D_i(k)Y_i^*(k)\}|^2}{E\{|D_i(k)|^2\}^2} \gamma$$

where γ is a constant that represents the maximum adaptation gain. When the filter is reasonably close to converging, $Y_i(k)$ would approximate the far-end component in the i-th subband, and therefore, $E\{D_i(k)Y^*_i(k)\}$ would approximate the far-end energy. In practice, it should be noted that the energy ratio should be limited to its theoretical range bounded by 0 and 1 (inclusively). This gain control decision works effectively in most conditions, with two exceptions which will be addressed in the subsequent discussion.

From the discussion above, $E\{D_i(k)Y^*_i(k)\}$ approximates the energy of the far-end component only when the adaptive filter converges. This means that over- or under-estimation of the far-end energy can occur when the filter is far from convergence. However, increased misadjustment, or divergence, is a problem only after the filter converges, so over-estimating the far-end energy actually helps accelerating the convergence process without causing a negative trade-off. On the other hand, under-estimating the far-end energy slows down or even paralyzes the convergence process, and therefore is a concern with the aforementioned gain control decision.

Specifically, under-estimation of far-end energy happens when $E\{D_i(k)Y^*_i(k)\}$ is much smaller than the energy of far-end component, $E\{|D_{fe,i}(k)|^2\}$. By analyzing all possible scenarios, under-estimating mainly happens in the following two situations: (1) When the system is reset, with all filter coefficients initialized as zero, $Y_i(k)$ would be zero. This leads to the adaptation gain μ being zero and the adaptive system being trapped as a result. (2) When the echo path gain suddenly increases, the $Y_i(k)$ computed based on the earlier samples would be much weaker than the actual far-end component. This can happen when the distance between speaker and microphone is suddenly reduced. Additionally, if the reference signal passes through an independent volume controller before reaching the speaker, the volume control gain would also figure into the echo path. Therefore turning up the volume would also increase echo path gain drastically.

Figure 6:
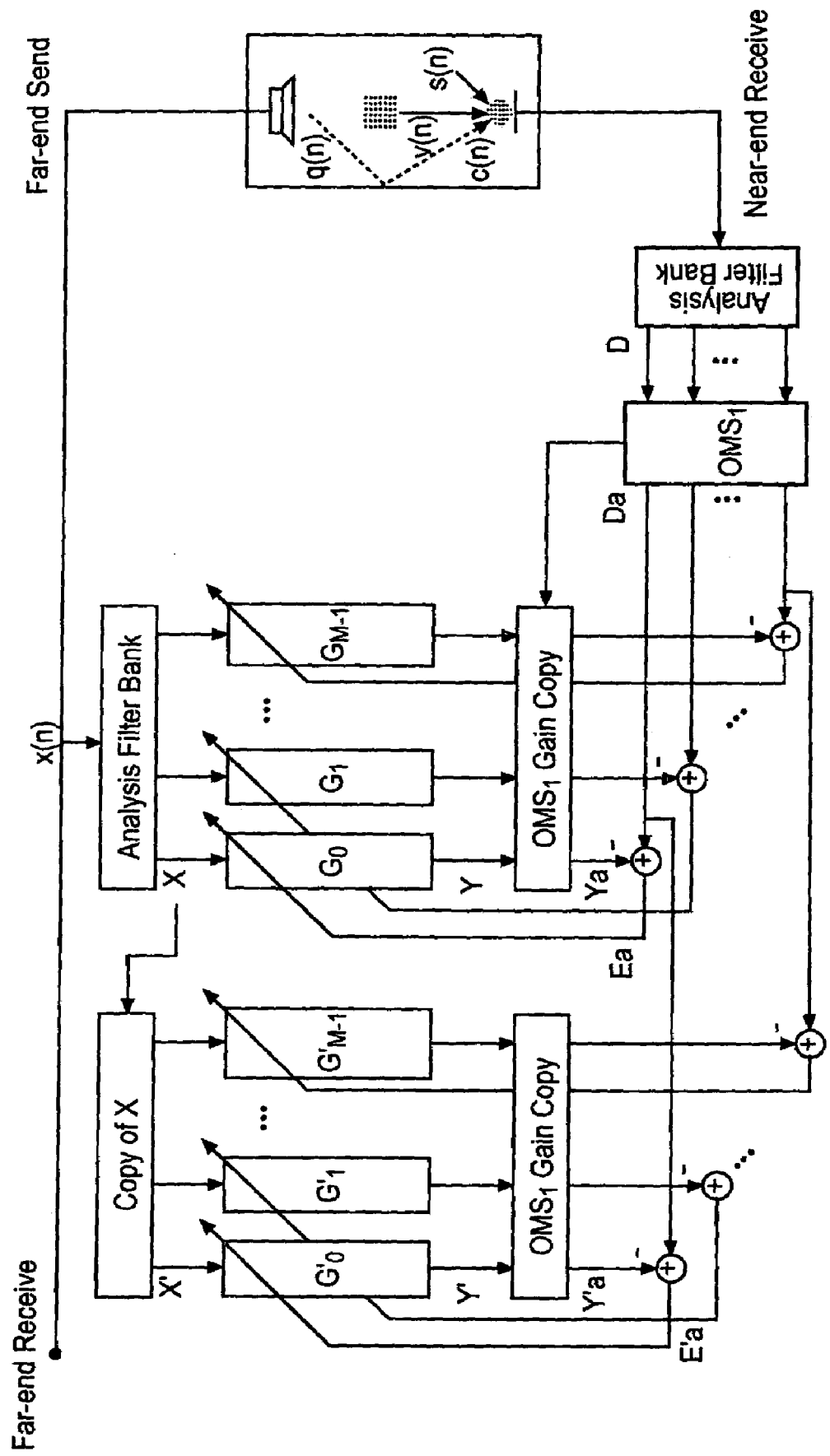
FIG. 6 illustrates main and auxiliary adaptive filters in an arrangement that overcomes deficiencies of a traditional DTD arrangement.

For the first situation, the adaptation gain control is suspended for a short interval right after the system reset, which helps kick-start the filter adaptation. For the second situation, an auxiliary filter ($\underline{G}'_i(k)$) is introduced to relieve the under-estimation problem. The auxiliary filter is a plain subband NLMS filter which is parallel to the main filter, as illustrated in FIG. 6, and with the number of taps being enough to cover the main echo path. Its adaptation gain constant should be small enough such that no significant divergence would result without any adaptation gain or double-talk control mechanism. After each adaptation, the 2-norms of the main and auxiliary filters in each subband are computed:

$$SqGa_i(k) = \|\underline{G}_i(k)\|_2$$

$$SqGb_i(k) = \|\underline{G}'_i(k)\|_2$$

which are estimates of echo path gain from both filters, respectively. Since the auxiliary filter is not constrained by the gain control decision, it is allowed to adapt freely all of the time. The under-estimation factor of the main filter can be estimated as $$RatSqG_i = \min\left(\frac{SqGa_i(k)}{SqGb_i(k)}, 1\right)$$

and the double-talk based adaptation gain control decision can be modified as $$\mu_i = \min\left(\frac{|E\{D_i(k)Y_i^*(k)\}|^2}{E\{|D_i(k)|^2\}^2 \times RatSqG_i}, 1\right)\gamma.$$

It can be observed that the auxiliary filter only affects system performance when its echo path gain surpasses that of the main filter. Furthermore, it only accelerates the adaptation of the main filter because $RatSqG_i$ is limited between 0 and 1.

As discussed previously, the acoustic echo cancellation problem is approached based on the assumption that the echo path can be modeled by a linear finite impulse response (FIR) system, which means that the far-end component received by the microphone is the result of the speaker signal transformed by an FIR filter. The AEC filter uses a subband NLMS-based adaptive algorithm to estimate the filter from the speaker and microphone signals in order to remove the far-end component from the microphone signal.

It can be observed that a residual echo is usually left in the output of the adaptive filter. Many factors can contribute to this. First of all, the linear FIR model might not be exactly satisfied. In addition, the echo path might be time-varying, which makes the adaptive filter lag behind no matter how fast it adapts. Finally, the misadjustment of the adaptive filter results in filter estimation error even if the model is perfect, the echo path is time-invariant, and the algorithm is fully converged. This residual echo usually makes the AEC performance unsatisfactory. Therefore, further attenuating the residual echo without significantly damaging the near-end speech is desired.

Figure 7:
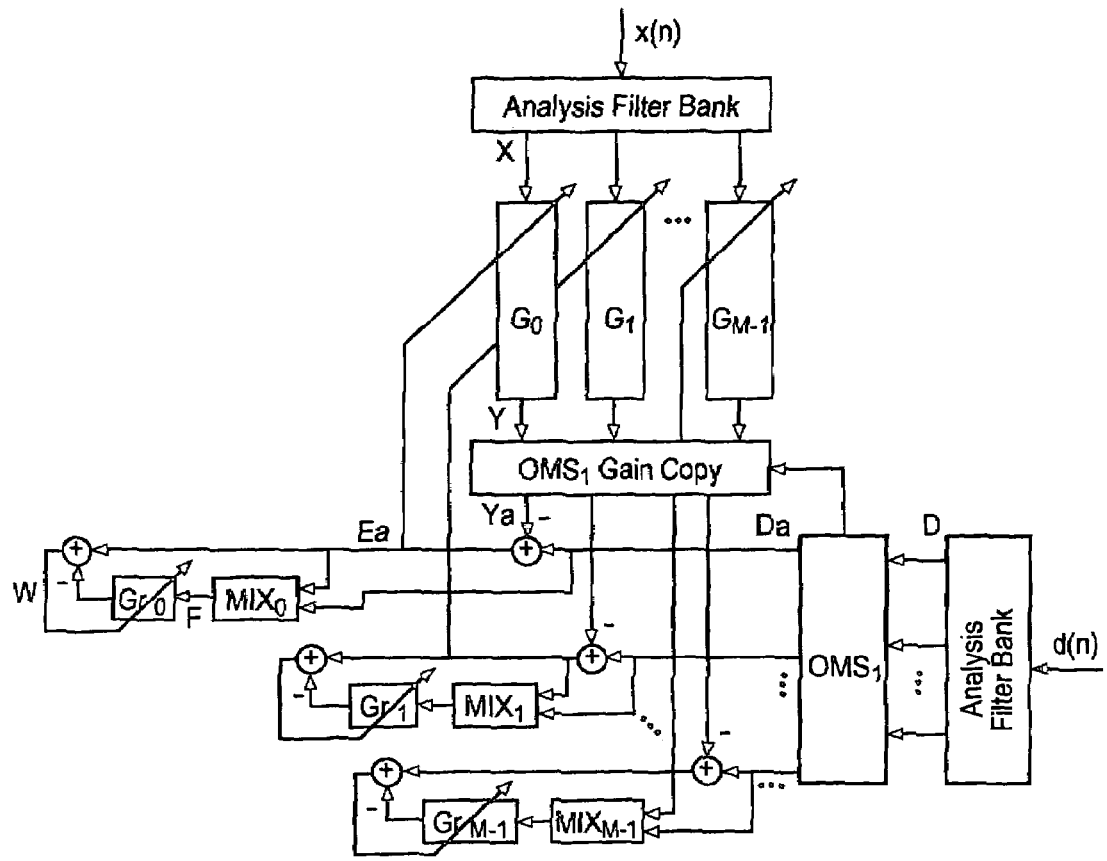
FIG. 7 illustrates a residual echo reduction filter.

A residual echo reduction (RER) filter is illustrated in FIG. 7 and is used to achieve this goal. Following the overall system structure, it works in each subband independently. For each subband, a one-tap NLMS filter is implemented with the main AEC filter output ($E_i(k)$) as the ideal signal. If the microphone signal ($D_i(k)$) is used as the reference signal, the one-tap filter will converge to $$G_{r,i}(k) = \frac{E\{E_i(k)D_i^*(k)\}}{E\{|D_i(k)|^2\}}.$$

When the microphone signal contains mostly far-end component, most of it should be removed from $E_i(k)$ by the main AEC filter and thus the absolute value of $G_{r,i}(k)$ should be close to 0. On the other hand, when the microphone signal contains mostly near-end component, $E_i(k)$ should approximate $D_i(k)$, and thus $G_{r,i}(k)$ is close to 1. Therefore, by applying $|G_{r,i}(k)|$ as a gain on $E_i(k)$, the residual echo can be greatly attenuated while the near-end speech is mostly intact.

To further protect the near-end speech, the input signal to the one-tap NLMS filter can be changed from $D_i(k)$ to $F_i(k)$, which is a weighted linear combination of $D_i(k)$ and $E_i(k)$ defined as $$F_i(k) = (1 - R_{NE,i}(k))D_i(k) + R_{NE,i}(k)E_i(k)$$

where $R_{NE,i}(k)$ is an instantaneous estimate of the near-end energy ratio. With this change, the solution of $G_{r,i}(k)$ becomes $$G_{r,i}(k) = \frac{E\{E_i(k)F_i^*(k)\}}{E\{|F_i(k)|^2\}}.$$

It can be observed that when $R_{NE,i}(k)$ is close to 1, $F_i(k)$ is effectively $E_i(k)$, and thus $G_{r,i}(k)$ is forced to stay close to 1. On the other hand, when $R_{NE,i}(k)$ is close to 0, $F_i(k)$ becomes $D_i(k)$, and $G_{r,i}(k)$ returns to the previous definition. Therefore, the RER filter preserves the near-end speech better with this modification while achieving similar residual echo reduction performance.

Because $|G_{r,i}(k)|$ is applied as the gain on $E_i(k)$, the adaptation rate of the RER filter affects the quality of output signal significantly. If adaptation is too slow, the on-set near-end speech after echo events can be seriously attenuated, and near-end speech can become ambient as well. On the other hand, if adaptation is too fast, unwanted residual echo can pop up and the background can become watery. To achieve optimal balance, an adaptation step-size control (ASC) is applied to the adaptation gain constant of the RER filter:

$$\mu_{r,i}(k) = ASC_i(k)\gamma_r$$

$$ASC_i(k) = (1 - \alpha_{ASC,i})|G_{r,i}(k-1)|^2 + \alpha_{ASC,i}\min\left(\frac{|E_i(k)|^2}{|F_i(k)|^2}, 1\right).$$

It can be observed that $ASC_i(k)$ is decided by the latest estimate of $|G_{r,i}|^2$ plus a one-step look ahead. The frequency-dependent parameter $\alpha_{ASC,i}$, which decides the weight of the one-step look ahead, is defined as $$\alpha_{ASC,i} = 1 - \exp(-M/(2i)), i = 0, 1, \ldots, (M/2)$$

where M is the DFT size. This gives more weight to the one-step look-ahead in the higher frequency subbands because the same number of samples cover more periods in the higher-frequency subbands, and hence the one-step look-ahead there is more reliable. This arrangement results in more flexibility at higher-frequency, which helps preserve high frequency components in the near-end speech.

The divergence control system basically protects the output of the system from rare divergence of the adaptive algorithm and it is based on the conservation of energy theory for each subband of the hands free system.

Figure 8:
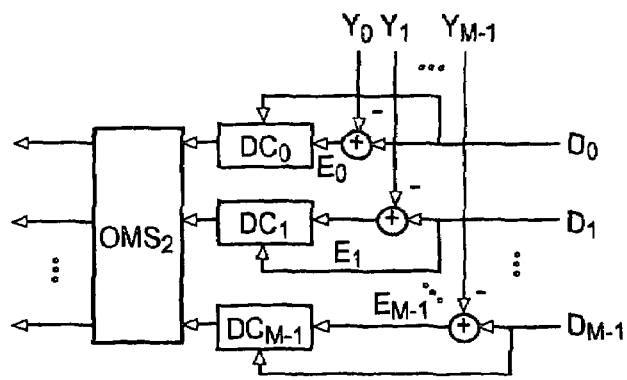
FIG. 8 illustrates a divergence control system.

FIG. 8 presents the block diagram of the divergence control system and it compares in each subband the power of the microphone signal ($D_i(k)$) with the power of the output of the adaptive filter ($Y_i(k)$). Because energy is being extracted (the echo) from the microphone signal, the power of the adaptive filter output has to be smaller than or equal to the power of the microphone signal in each subband, if this does not happen it means that the adaptive subfilter is adding energy to the system and the assumption will be that the adaptive algorithm diverged, if it occurs the output of the subtraction block ($E_i(k)$), is replaced by the microphone signal $D_i(k)$).

The divergence control system is also used for the subtraction blocks after OMS1 and before the RER calculation to improve the performance of the RER in case of divergence of the main adaptive filter.

The objective of the comfort noise generator (CNG) is to compensate for the irregularities at the noise floor in the output signal caused by the residual echo reduction. Basically for each subband an estimate of the magnitude of the noise floor before the residual echo reduction block is made, and compared with the magnitude of the signal after the residual echo reduction block. If the magnitude of the signal after the RER block is smaller than the magnitude of the signal before the RER block, a signal with the magnitude of the result of the difference between these two signals and random phase is added to the output signal, otherwise nothing is added. Observe that the CNG proposed also can compensate existing discontinuities in frequency domain on the microphone signal, which will provide an audible improvement on the quality of the system output signal.

Figure 9A:
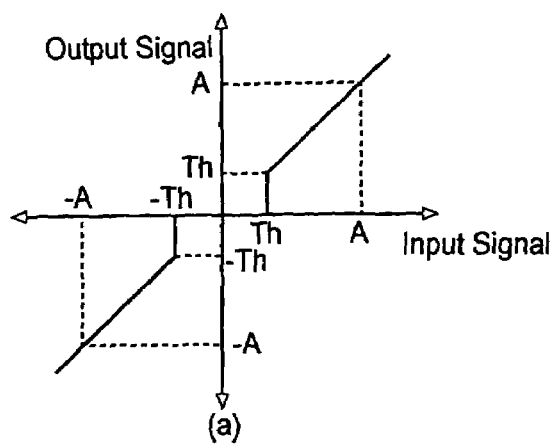
FIGS. 9A-9B illustrate a nonlinear processor implementation.
Figure 9B:
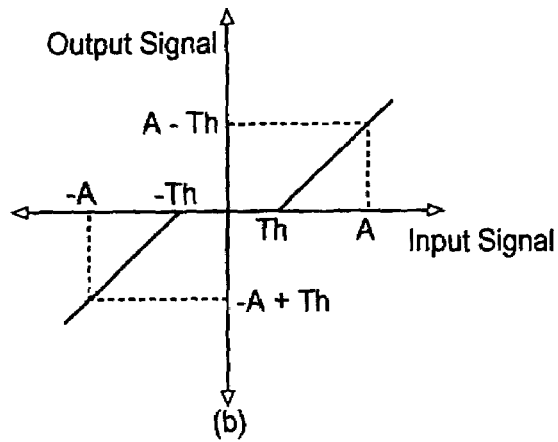

The center-clipping also known as the non linear processor (NLP) is implemented to remove some residual echo that is still present at the output signal, it works in time domain and it basically puts to zero the samples that have absolute value smaller than a predefined threshold (Th). There are two different approaches, and they are presented in FIGS. 9A-9B.

Figure 10:
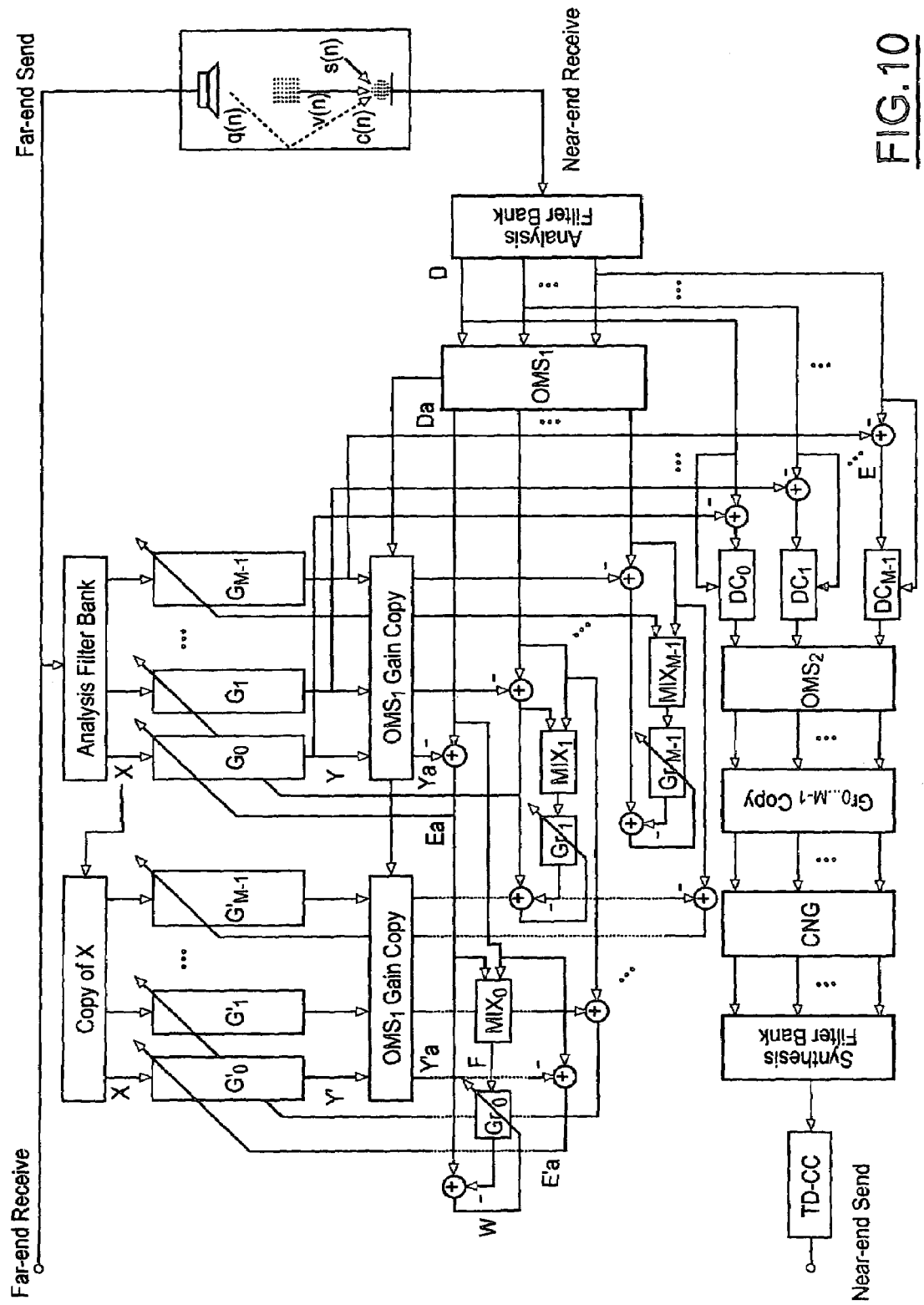
FIG. 10 illustrates a method and system for clear signal capture which incorporates a plurality of features.
Figure 12:
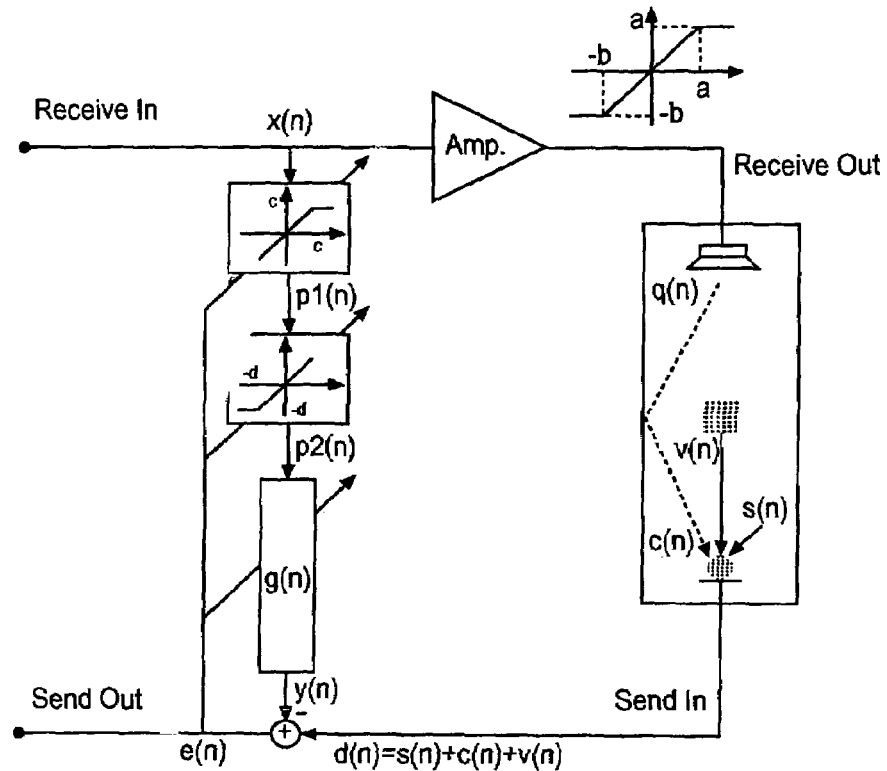
FIG. 12 illustrates an ANLAF including a cascade of two nonlinear systems, one representing the upper clipping point and the other one representing the lower clipping point.

The block diagram of a complete system is presented in FIG. 10. FIG. 10 illustrates how different parts of the system are implemented together.

The block TD-CC represents the center-clipping implementation in time domain. The block CNG represents the comfort noise generator and it is implemented in frequency domain after the RER algorithm represented by the $Gr_1 \ldots _{M-1}$ Copy block.

The system shown in FIG. 10, in certain situations, may produce an output signal with some remaining echo, particularly when strong nonlinearity is present. Nonlinearity is generally caused by amplifiers and/or loud speakers and is further complicated by the desire to operate the system at high volume level. In applications such as hands free handsets, where the speaker and microphone are very close, the problem is the great difference in ratio between the echo and near-end speech. As a result of this nonlinearity, new harmonic components are generated in the echo signal, which require some kind of nonlinear processor to improve the performance of the acoustic echo canceller.

This preferred embodiment of the invention uses five different approaches to cancel the remaining echo of the system due to nonlinearities. These approaches include the asymmetric nonlinear adaptive filter (ANLAF), the frequency dependent nonlinear processor (FD_NLP), the step size control to improve the nonlinear processing (SSC_NLP), the virtual state machine (VSM) and the dynamic nonlinear compensation (DNLC). In accordance with a preferred embodiment of the invention, a nonlinear package is composed of these parts.

Basic descriptions for the different parts of the nonlinear package are:

ANLAF—The Asymmetric Nonlinear Adaptive Filter.

This part determines if the system has nonlinearity such as hard clip on the power amplifier of the loud speaker or soft clip at the loud speaker. After identifying the nonlinearity, the adequate compensation is introduced on the system automatically.

FD_NLP—The Frequency Dependent Nonlinear Processor.

This part is based on different effectiveness of the acoustic echo cancellation system in different frequencies. Initially, it was observed that in applications, such as hands-free handset, the presence of nonlinearity when operating in high volume level generates residual echo only in high frequency bands. Using this information, an automatic algorithm that reduces such high frequency residual echo was developed.

SSC_NLP—The Step Size Control to Improve the Nonlinear Processing.

During the minimization of MSE (mean square error), nonlinearities can generate local minima that trap adaptive filter algorithms. By increasing the step size of the adaptive algorithm, the system can escape from local minima and reach the global minimum.

VSM—The Virtual State Machine.

This part works in a similar way as the conventional state machine, but it is used only if nonlinearity is detected, in order to preserve the high quality performance of the system in normal situation.

DNLC—The Dynamic Nonlinear Compensation

The above mentioned four approaches are used basically in systems where the HFK system does not have information about the volume control. In other words, the changes in volume are made independently after the HFK system captures the reference signal. But in cases where the volume information is given to the HFK system, and the operational range of the volume is in the nonlinear range of the power amplifier or the loud speaker, a compensation of this nonlinearity can be made at the reference signal. In this approach, additional nonlinear process can be avoided, but the volume information of the system has to be known a priori.

With the implementation of the nonlinear package, it is believed that outstanding performance can be obtained in diverse situations, including very challenging applications such as the hands free handset and the very loud hands free automobile systems. Observe that the choice of the different units from the nonlinear package is made based on the target application.

The nonlinear package comprehends various approaches to cancel the remaining echo of the system due to nonlinearities. These approaches include:

Derivation of the ANLAF for asymmetric clipping points.

Proposition of the FD_NLP, which assumes that some types of nonlinearities produce residual echo only in selected frequency bands.

The SSC_NLP, which assumes that some nonlinearities generate local minimums at the MSE surface of the adaptive filter.

A virtual state machine that is enabled only if nonlinearity is detected.

The volume dependent nonlinear compensation.

The Nonlinear Package

The non-linear package contains five different components, i.e. the ANLAF, the FD_NLP, the SSC_NLP, the VSM and the DNLC. In this section all of these parts will be described in detail.

The Asymmetric Nonlinear Adaptive Filter

One of the main causes of nonlinearity in AEC (Acoustic Echo Cancellation) systems is the nonlinearity existent at the power amplifier or at the loud speaker for large amplitudes signals. To deal with this problem, a memory-less nonlinear adaptive filter was proposed in the prior art.

In the prior art, the adaptive algorithm considers only symmetric hard clipping points. However in some application, the clipping points can be asymmetric due to different characteristics of the power amplifier or the loud speaker.

Figure 11:
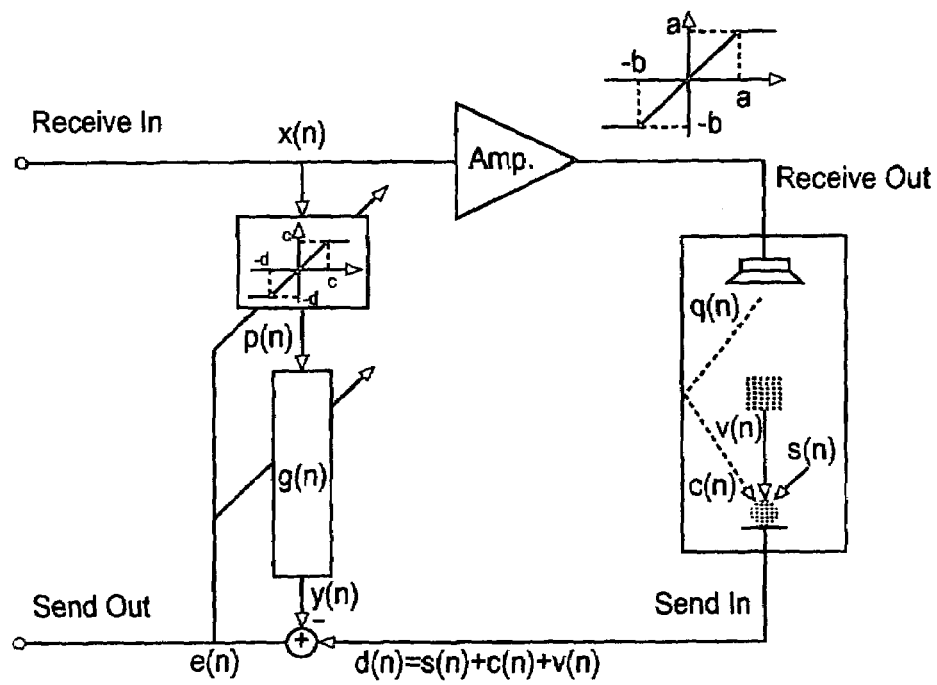
FIG. 11 illustrates an asynmmetric nonlinear adaptive filter (ANLAF)

The block diagram which illustrates the ANLAF is shown in FIG. 11, where the assumption is the system, power amplifier (Amp.) and loud speaker, has different hard clipping points at points "a" and "b." After being clipped the reference signal x(n) is propagated through the acoustic path q(n) and captured by the microphone generating the echo signal c(n). To cancel the echo signal a nonlinear adaptive filter is used to determine the clipping points (represented in the FIG. 11 as "c" and "d"), in series with a FIR (Finite Impulse Response) adaptive filter g (n) to identify the acoustic echo path q (n). Then the output of the adaptive filter is subtracted from the microphone signal. It is easily observed that if c=a, d=b and g(n)=q(n), then y(n)=c(n). Therefore, the subtraction of the output signal of the adaptive filter from the microphone signal will cancel the echo signal.

The joint NLMS adaptation algorithm of the preprocessor and FIR filter is given by Table 1.

TABLE 1

| | Nonlinear Adaptive Filtering Algorithm |
|---|---|
| 1. | $x(n) = [x(n), x(n-1), \ldots, x(n-N+1)]^T$ |
| 2. | $p(n) = f(z(n), x(n))$ |
| 3. | $p(n) = [p(n), p(n-1), \ldots, p(n-N+1)]^T$ |
| 4. | $e(n) = d(n) - g^T(n)p(n)$ |
| 5. | $z(n+1) = z(n) + \mu_z(f'(z(n)^T, x(n))^T g(n)e(n)$ |
| 6. | $g(n+1) = g(n) + \dfrac{\alpha_g}{\|p(n)\|_2^2} p(n)e(n)$ | x(n) represents the reference signal, N is the number of taps of the adaptive filter, z(n) is the nonlinear processor that is generally a polynomial with order R where in this case we have:

$$f(z(n), x(n)) = \sum_{r=1}^{R} z_r(n) x^r(n)$$

p(n) is the output of the nonlinear processor, g(n) is a N order vector with the coefficients of the adaptive filter, d(n) is the microphone signal, e(n) is the error signal, $\mu_z$ is the step size for the update of the adaptive filter which identifies the coefficients of the polynomial z(n),' represents first-order derivative and $\alpha_g$ is the step size of the adaptive filter g(n).

In the first case where the nonlinearity is caused by a symmetric hard clip (l_clip (lower clipping)=u_clip (upper clipping)=p_clip), the function $f(z,x)$ and the derivative $f'(z,x)$ will be given by:

$$f(z, x) = \begin{cases} -\text{p\_clip} & x \leq -\text{p\_clip} \\ x & |x| < \text{u\_clip} \\ \text{p\_clip} & x \geq \text{p\_clip} \end{cases}$$

$$f'(z, x) = \begin{cases} -1 & x \leq -\text{p\_clip} \\ 0 & |x| < \text{p\_clip} \\ 1 & x \geq \text{p\_clip} \end{cases}$$

For the asymmetric clipping point system the idea above is extended to a cascade of two nonlinear systems, one representing the upper clipping point and the other one representing the lower clipping point, as shown in FIG. 2.

Now the updating equations for the different clipping points and the adaptive filter will be given by Table 2.

TABLE 2

Asymmetric Nonlinear Adaptive Filtering Algorithm

1. $x(n) = [x(n), x(n-1), \ldots, x(n-N+1)]^T$
2. $p1(n) = f(z\_upper(n), x(n))$
3. $p1(n) = [p1(n), p1(n-1), \ldots, p1(n-N+1)]^T$
4. $p2(n) = f(z\_lower(n), p1(n))$
5. $p2(n) = [p2(n), p2(n-1), \ldots, p2(n-N+1)]^T$
6. $e(n) = d(n) - g^T(n)p2(n)$
7. $z\_upper(n+1) = z\_upper(n) + \mu_{z\_upper}$
   $(f'(z\_upper(n)^T, x(n))^T g(n)e(n)$
8. $z\_lower(n+1) = z\_lower(n) + \mu_{z\_lower}$
   $(f'(z\_lower(n)^T, p1(n))^T g(n)e(n)$
9. $g(n+1) = g(n) + \dfrac{\alpha_g}{\|p2(n)\|_2^2} p2(n)e(n)$ Now the functions $f(z\_upper,x)$, $f(z\_lower,p1)$ and derivation will be given by:

$$f(z\_upper, x) = \begin{cases} x & x < \text{u\_clip} \\ \text{u\_clip} & x \geq \text{u\_clip} \end{cases}$$

$$f'(z\_upper, x) = \begin{cases} 0 & x < \text{u\_clip} \\ 1 & x \geq \text{u\_clip} \end{cases}$$

$$f(z\_lower, p1) = \begin{cases} -\text{l\_clip} & p1 < -\text{l\_clip} \\ p1 & p1 \geq -\text{l\_clip} \end{cases}$$

$$f'(z\_lower, p1) = \begin{cases} -1 & p1 < -\text{l\_clip} \\ 0 & p1 \geq -\text{l\_clip} \end{cases}$$

Figure 13:
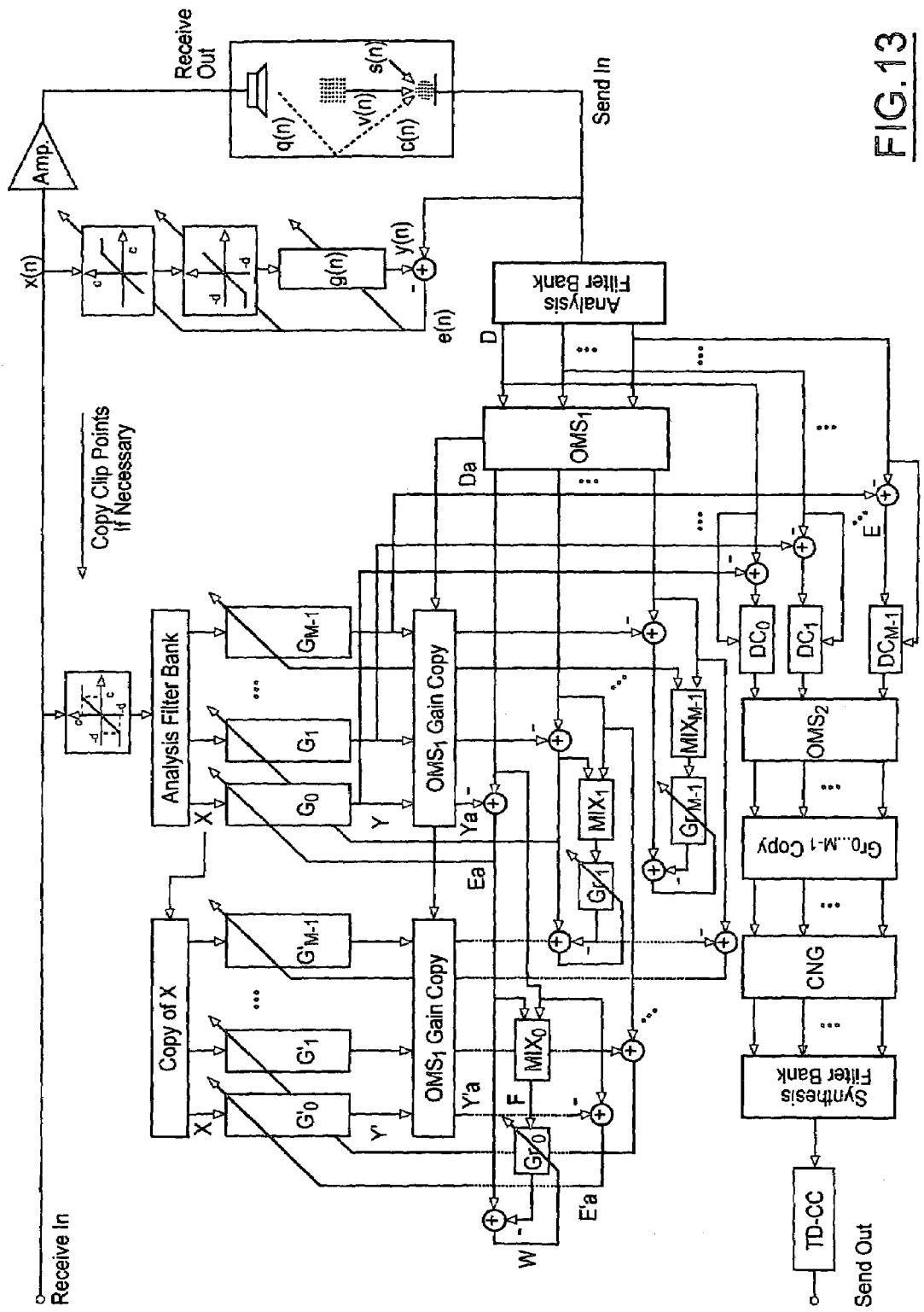
FIG. 13 illustrates using the ANLAF independently as a parallel path to determine the clipping points.

Considering the AEC system in FIG. 10, the proposed approach in this section is to use the ANLAF independently as a parallel path to determine the clipping points and then, if necessary, to compensate the nonlinearities at the main path filter of the algorithm. The structure of this approach is shown in FIG. 13.

The time domain adaptive filter introduced in the structure also should have a double talk control (DTC) to guarantee the stability of the adaptive algorithm. It is obtained by averaging the respective component already computed in the frequency domain that is given by:

$$DTC_{fullband} = \frac{1}{(M+1)} \sum_{i=0}^{i=M} \frac{|E\{D_i(k)Y_i^*(k)\}|^2}{E\{|D_i(k)|^2\}^2}$$

where M is the FFT size divided by 2, $D_i(k)$ is the spectrum of microphone signal d(n), $Y_i(k)$ is the spectrum of main filter output y(n).

Observe that $DTC_{fullband}$ will multiply the terms: $\mu_{z\_upper}$, $\mu_{z\_lower}$ and $\alpha_g$, as shown in Table 2.

Examples of decisions to compensate for the clipping at the main adaptive filter are:

How much the input signal x(n) is bigger or lower than the clipping point, i.e. the compensation will be made only if $x(n)>Th\_up*z\_upper$ or $x(n)>-Th\_lower*z\_lower$.

To protect the performance of the algorithm, a lower threshold for the clipping points can be defined, and the compensation will never be made if the clipping points (z_upper and z_lower) are smaller than this threshold.

Also the ERLE estimation can be made using the receive in and the receive out signals, and if the clipping point compensation does not improve the ERLE, it can be disabled.

Observe that different systems or applications can generate different tuning parameters for the ANLAF.

The Frequency Dependent Non-Linear Processor

The FD_NLP is based on the effectiveness of the AEC system in different frequencies when the determined type of nonlinearity is present in the system. Basically, as was verified experimentally for systems such as hands free handset operating in high volume level, the performance of the algorithm was very good for the low frequency bands echo. But for high frequency bands the system does not have the same performance. In other words, we can say that most of the residual echo have only high frequency characteristics.

To improve the fulfillment of the system, the information extracted from the parameter $G_{r,i}(k)$ (the residual echo reduction attenuation) is used computing for the factor:

$$B_{att}(k) = \frac{1}{H\_band - L\_band} \sum_{i=L\_band}^{H\_band} G_{r,i}(k)$$

where $$G_{r,i}(k) = \frac{E\{E_i(k)D_i^*(k)\}}{E\{|D_i(k)|^2\}}$$

E represents the expectation value, $D_i(k)$ is the spectrum of the microphone signal d(n), $E_i(k)$ is the spectrum of the error signal e(n), * represents the complex conjugate operation, and L_band and H_band correspond to the lower and upper bounds of the region where $G_{r,i}(k)$ has a good fulfillment of the system. Obviously this region depends on the practical application and hardware characteristics, therefore each system will have different bounds.

If the computed $B_{att}$ is smaller than a certain threshold (Th_B), a fixed attenuation Att_FDNLP is applied in frequency domain on a defined group of frequency bands (G_band), i.e.

```
if B_att (k) ≤ Th_B
    FDNLP_vector(G_band) = Att_FDNLP
end
```

Figure 15:
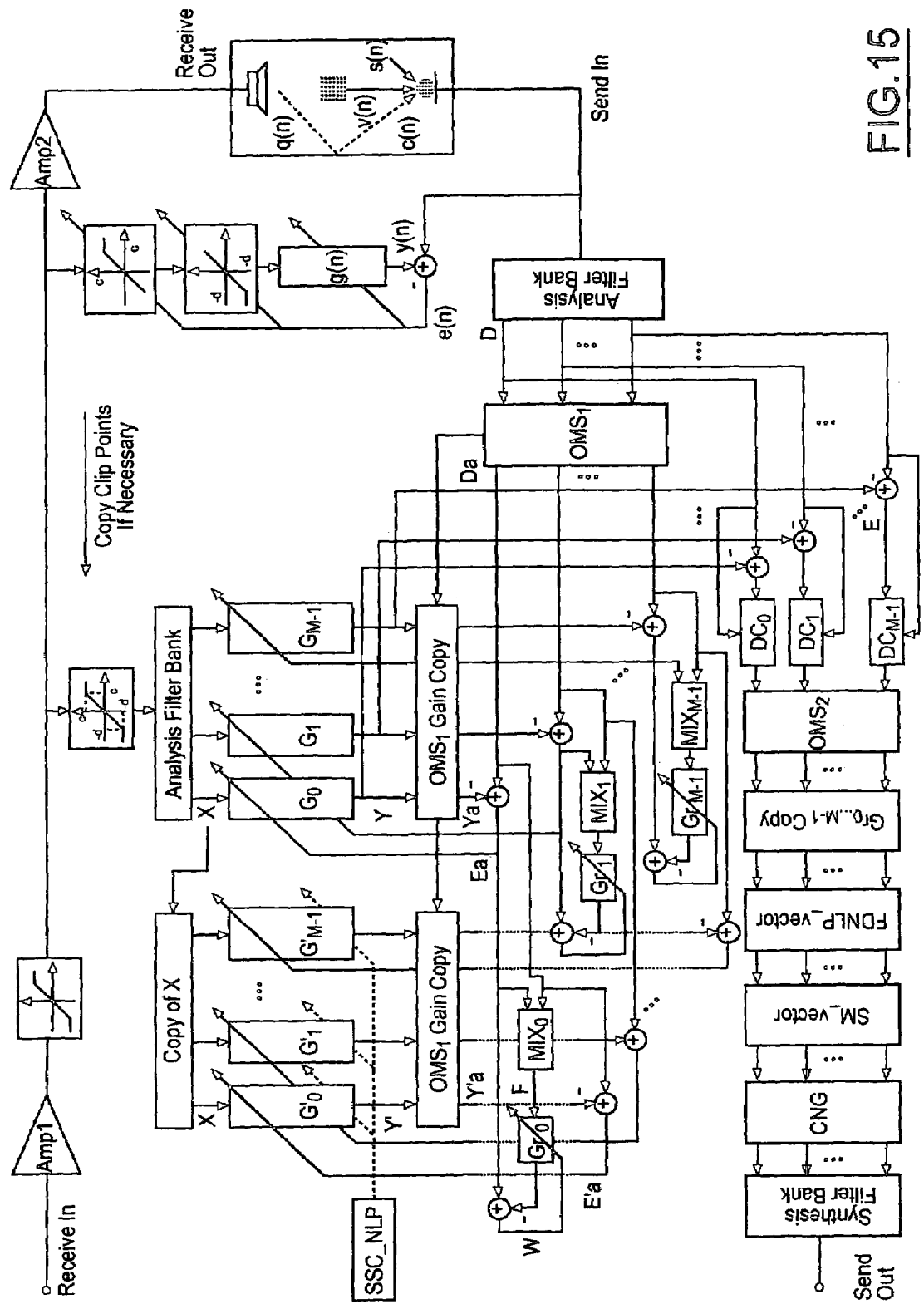
FIG. 15 illustrates a block diagram of an AEC system including the nonlinear package in accordance with a preferred embodiment of the invention.

Generally, G_band is a group of high frequency bands, and the resulted FDNLP_vector is applied in the AEC system as shown in FIG. 15.

The Step Size Control to improve the Nonlinear Processing

In the system shown in FIG. 10, the step size $\mu_i$ of the i-th subband of the main adaptive filter is given by:

$$\mu_i = \min\left(\frac{RatFE_i}{RatSqG_i}, 1\right)\gamma$$

where $$RatFE_i = \frac{|E\{D_i(k)Y_i^*(k)\}|^2}{E\{|D_i(k)|^2\}^2}$$

$$RatSqG_i = \min\left(\frac{SqGa_i(k)}{SqGb_i(k)}, 1\right)$$

$\gamma$ is the maximum adaptation gain, $D_i(k)$ is the spectrum of the microphone signal d(n), $Y_i(k)$ is the spectrum of main filter output y(n), and $SqGa_i(k)$, $SqGb_i(k)$ are the 2-norms of the coefficients of the main and auxiliary adaptive filters respectively. In the case when the far-end signal x(n) (or filter output y(n)) and the microphone signal d(n) are not linearly dependent, due to echo path change or nonlinearity, the parameter $\mu_i$ becomes smaller than the desired value. This will cause high residual echo.

Consider the coherence function of arbitrary signals a and b, as given by:

$$C_{ab,i}(k) = |P_{ab,i}(k)|^2/(P_{a,i}(k)P_{b,i}(k))$$

where $P_{ab,i}(k)$ is the cross power spectrum of a and b, $P_{a,i}(k)$ is the power spectrum of a and $P_{b,i}(k)$ is the power spectrum of b. The coherence function shows the frequency dependent correlation between a and b. If $C_{ab,i}(k)$ is 1 at a certain frequency i, then there is a perfect correlation between a and b (or a is linearly dependent to b) at that frequency.

In practical implementation the following approximation is used:

$$\tilde{C}_{ab,i}(k) \approx |P_{ab,i}(k)|^2/P_{a,i}(k)^2$$

due to the fact that $\tilde{C}_{ab,i}(k)$ fluctuates less than $C_{ab,i}(k)$ in a real-time implementation. Therefore, $RatFE_i$ is already an approximated coherence function, by comparing $\tilde{C}_{ab,i}(k)$ with $RatFE_i$.

Then the proposed solution is to use $RatFE_i$ as a measure of linearly dependence between $D_i(k)$ and $Y_i(k)$, in making the following classification of near-end and far-end speeches.

TABLE 3

"State" Classification

| | Classification |
|---|---|
| $RatFE_i \geq LT\_HB$ | (1) Single-talk far-end: far-end and near-end are linearly dependent |
| $LT\_LB \leq RatFE_i < LT\_HB$ | (2) Single-talk far-end: far-end and near-end are NOT linearly dependent |
| $RatFE_i < LT\_LB$ | (3) Double-talk or Single-talk near-end |

Typically, the high bound LT_HB is chosen as 0.7, and the low bound LT_LB is chosen as 0.4.

In the case of Classification 2, the adaptation step-size for the auxiliary filter $Gb_i(k)$ is set to 1 instead of the default 0.1. This step size will increase the convergence rate of the auxiliary filter, resulting into a small $RatSqG_i$ that will eventually increase the value of $\mu_i$ as desired. Therefore, $\mu_i$ will have a bigger value than it is normally estimated, which gives two effects. The first effect is a big step-size at the right steepest descent direction helps the main adaptive filter to escape from local minima in a nonlinear estimation problem. The second effect is a big step-size speeds up the convergence of the main filter. These two effects give a combined result of reducing the residual echo.

Note that in the case of Classification 1 and 3, the adaptation step-size for the auxiliary filter $Gb_i(k)$ is set to the default 0.1. This solution, in the preferred implementation, modifies the adaptation step-size for the auxiliary filter $Gb_i(i)$ instead of changing directly the step-size for the main filter $Ga_i(k)$, to avoid divergence in $Ga_i(k)$ due to misclassification of near-end and far-end speeches.

The Virtual State Machine

The Virtual State Machine (VSM) has the similar function of the generally known "State Machines." The main difference here is that the VSM is enabled only if a nonlinear condition is detected in the system.

The implementation of state machines generally includes computing a set of variables that contain information about different states (i.e. send-only, receive-only, double-talk, and idle) and defining thresholds for these variables to differentiate the states. In the AEC system of FIG. 10, the variables $G_{r,i}(k)$ and $RatFE_i$ can be used as state differentiators. Both of them are normalized between '0' and '1'. $G_{r,i}(k)$ will be close to '0' for receive-only, close to '1' for send-only, and between "0" and "1" for double-talk condition or the presence of nonlinearity in the system. $RatFE_i$ will be close to '1' for receive-only, close to '0' for send-only, and between "0" and "1" for double-talk condition or the presence of nonlinearity. It can be observed that the two variables change in opposite ways.

Based on these two variables, the following two types of the virtual state machine are proposed. They can be implemented individually or combined in cascade.

Method 1

In the system shown in FIG. 10, the gain $G_{r,i}(k)$ is applied to the output of the main AEC filter to further reduce residual echo. If the linear dependency between the reference signal x(n) and the microphone signal d(n) are reduced due to nonlinearity, e(n) will correlate more with d(n) and thus $G_{r,i}(k)$ becomes bigger than the desired value and causes high residual echo.

The gain $G_{r,i}(k)$ can be considered as an approximated coherence function, by comparing $\tilde{C}_{ab}(w)$ with $G_{r,i}(k)$. Since $G_{r,i}(k)$ is related to $RatFE_i$, it is proposed to use $RatFE_i$ instead of $G_{r,i}(k)$ as a measure of linearity, as described for the step size control.

A gain RERC is introduced that gives an additional attenuation to the residual echo by:

$$E_i(k) = RERC * G_{r,i}(k) * E_i(k)$$

where $$RERC = \frac{\sum_{i=LF}^{HF} A_i}{HF - LF}$$

HF and LF are the upper- and lower-bounds of the frequency bands included for this decision. $A_i$ has a range of $0 < A_i < 1$ and has different values for the Classifications 1, 2 and 3 defined for the step size control. Typically, $A_i$, can be chosen as the following:

| Classification | $A_i$ |
|---|---|
| 1 | 0 |
| 2 | 0.5 |
| 3 | 1 |

The goal of RERC is to remove any residual echo during Classifications 1 and 2, and pass through the near-end speech during Classification 3. The average gain RERC is used instead of gain $A_i$ for individual i-th sub-band to avoid degradation in quality of speech due to misclassification of near-end and far-end speeches.

Method 2

Consider a new variable given by the difference between the average values of $G_{r,i}(k)$ and $RatFE_i$, i.e.

$$SM\_value_{att}(k) = \frac{1}{SM\_HB - SM\_LB}\left(\sum_{i=SM\_LB}^{SM\_HB} G_{r,i}(k) - \sum_{i=SM\_LB}^{SM\_HB} RatFE_i(k)\right)$$

where SM_HB and SM_LB correspond to the lower- and upper-bounds of the frequency bands where the average will be performed. The cross-band average are used in order to improve the accuracy of the state determination and to avoid the use of hold time. In this application, we use the bands between 300 Hz and 1500 Hz due to the fact that the result is more reliable since the power of the speech signal is stronger in this region.

The computed $SM\_value_{att}$ is compared to a certain threshold (Th_SM), an attenuation Att_SM is applied in the frequency domain to a defined group of frequency bands (G_band_SM), i.e.

```
if   SM_value_att(k) ≤ Th_SM
     SM_vector(G_band_SM) = Att_SM
end
```

The resulted SM_vector is applied to the AEC system as shown in FIG. 15. Observe that $SM\_value_{att}$ is normalized between '−1' and '1', and that it is close to '−1' in receive-only, close to '1' in send-only, and between '−1' and '1' for double-talk or the presence of nonlinearity in the system. The threshold Th_SM is dependent to the application, but a typical value is '0'. Att_SM also depends on the application and can have different values for different frequency bands.

The Dynamic Nonlinear Compensation

Figure 14:
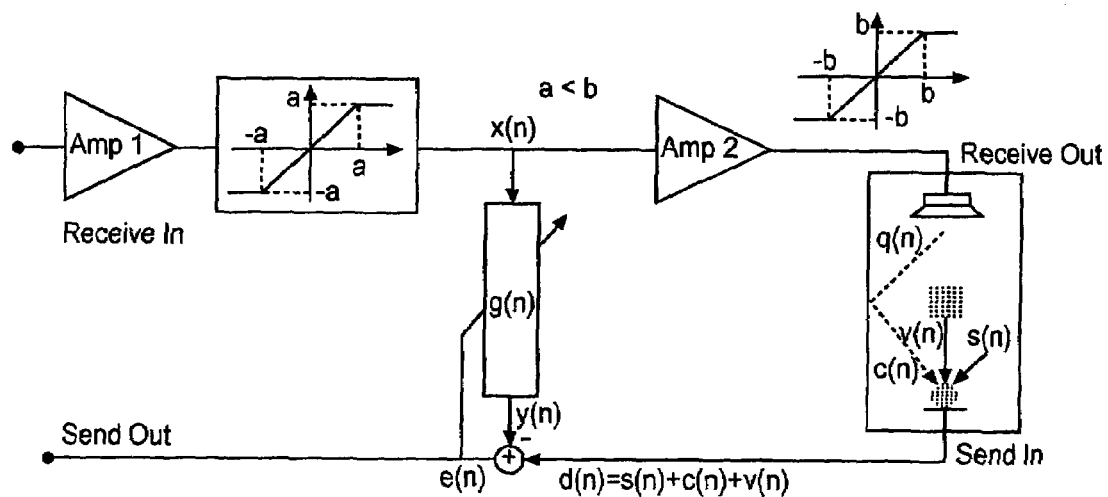
FIG. 14 illustrates applying a nonlinear compensation hard clip to the reference signal before the input of the adaptive filter in the case where a known nonlinearity is present in a system of power amplifier and loudspeaker.

The Dynamic Nonlinear Compensation uses the fact that in the case a known nonlinearity is present in a system of power amplifier and loud speaker (for example, a hard clip at point b, as presented in FIG. 14), a nonlinear compensation by a hard clip at point a (a<b) can be applied to the reference signal before the input of the adaptive filter in the HFK system as shown in FIG. 14. The nonlinearity is represented by a hard clipping for simplicity. Obviously, it can be substituted by a soft clipping or other suitable functions.

Observe that in real systems (for example, hands free handset), to obtain the desired loudness at the output of the loud speaker, the input signal x(n) is generally clipped a lot. Obviously it causes distortion in the speech signal, but it is the only way to increase the loudness when the voltage level is limited at the output system, Amp 2 and loud speaker. In application similar to handsets as shown in FIG. 14, it is proposed that the gain of Amp 2 is fixed, and the volume is changed only at Amp 1 in the digital domain. Observe it is important to match the dynamic range between the output of the codec of the digital system with the dynamic range of the system, Amp 2 and loud speaker. Using this approach the volume change can be performed only in Amp 1, the desired loudness can be achieved and hopefully no extra nonlinear processing would be required.

The Complete HFK System with the Nonlinear Package

The block diagram of the AEC system of FIG. 10 together with the nonlinear package proposed here is presented at FIG. 15. Observe that as described before the nonlinear package is composed by the ANLAF, the FD_NLF, the SSC_NLP, the VSM and the DNP. In real applications, depending on the type of the nonlinearity, the necessary parts of the nonlinear package can be used to achieve the desired performance of the system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of acoustic echo cancellation (AEC) wherein a microphone signal resulting from an unobservable signal corrupted by both additive background noise and an acoustic echo is processed in an attempt to restore the unobservable signal, the acoustic echo being a speaker signal modified by an acoustic path, wherein an adaptive filter models the echo path, the method comprising:

receiving the microphone signal;

applying a first asymmetric nonlinear adaptive filter in fullband to the speaker signal to produce a first output signal;

applying a first adaptive filter in fullband to the first output signal to produce a first echo signal that models the acoustic echo;

subtracting the first echo signal from the microphone signal to produce a first echoless signal that resembles the unobservable signal; and adapting the first nonlinear adaptive filter in fullband and the first adaptive filter based on the first echoless signal.

2. The method of claim 1 wherein the first asymmetric nonlinear adaptive filter is composed of a cascade of at least two nonlinear systems including a first system representing an upper clipping point and a second system representing a lower clipping point.

3. The method of claim 1 further comprising:
applying a double talk control, obtained from a frequency domain implementation, to modify an update equation of clipping points of the first asymmetric nonlinear adaptive filter.

4. The method of claim 1 further comprising:
selectively applying a second asymmetric nonlinear adaptive filter in fullband, to the speaker signal to produce a second output signal, the second asymmetric nonlinear adaptive filter being set based on the first asymmetric nonlinear adaptive filter;
applying a main adaptive filter in fullband to the second output signal to produce a second echo signal that models the acoustic echo;
subtracting the second echo signal from the microphone signal in frequency domain to produce a second echoless signal that resembles the unobservable signal; and
adapting the main adaptive filter in frequency domain based on the second echoless signal.

5. The method of claim 4 wherein the first asymmetric nonlinear adaptive filter is composed of a cascade of at least two nonlinear systems including a first system representing an upper clipping point and a second system representing a lower clipping point.

6. The method of claim 4 further comprising:
applying a double talk control, obtained from a frequency domain implementation, to modify an update equation of clipping points of the first asymmetric nonlinear adaptive filter.

7. The method of claim 4 wherein the selective application of the second asymmetric nonlinear adaptive filter is based on a comparison of the speaker signal to clipping points defined by the first asymmetric nonlinear adaptive filter.

8. The method of claim 7 wherein the second asymmetric nonlinear adaptive filter is disabled when the clipping points are smaller than a predetermined threshold.

9. The method of claim 7 wherein the second asymmetric nonlinear adaptive filter is disabled when the echo return loss enhancement (ERLE) degrades when the clipping points are applied.

10. A method of acoustic echo cancellation (AEC) wherein a microphone signal resulting from an unobservable signal corrupted by both additive background noise and an acoustic echo is processed in an attempt to restore the unobservable signal, the acoustic echo being a speaker signal modified by an acoustic path, wherein an adaptive filter in frequency domain models the echo path, the method including receiving the microphone signal, applying an adaptive filter in sub-bands to the speaker signal to produce an echo signal that models the acoustic echo, subtracting the echo signal from the microphone signal to produce a frequency domain echoless signal that resembles the unobservable signal, and adapting the adaptive filter based on the frequency domain echoless signal, the method further comprising:
applying a residual echo reduction filter to the frequency domain echoless signal;
determining an average bandwidth attenuation factor based on the coefficients of the residual echo reduction filter;
determining a threshold; and
when the average bandwidth attenuation factor is less than the threshold, applying a frequency dependent nonlinear attenuation vector to a defined group of frequency bands.

11. The method of claim 10 wherein the defined group of frequency bands is a group of high frequency bands, thereby providing frequency dependent nonlinear processing to further reduce high frequency echo.

12. A method of acoustic echo cancellation (AEC) wherein a microphone signal resulting from an unobservable signal corrupted by both additive background noise and an acoustic echo is processed in an attempt to restore the unobservable signal, the acoustic echo being a speaker signal modified by an acoustic path, wherein an adaptive filter in frequency domain models the echo path, the method including receiving the microphone signal, applying an adaptive filter in sub-bands to the speaker signal to produce an echo signal that models the acoustic echo, subtracting the echo signal from the microphone signal to produce a frequency domain echoless signal that resembles the unobservable signal, and adapting the adaptive filter based on the frequency domain echoless signal, the method further comprising:
making a classification of near-end and far-end speeches to detect a nonlinear relationship between near-end and far-end speeches; and
in the event that a nonlinear relationship is detected, increasing the adaptation rate of the adaptive filter in frequency domain to escape local minima and approach the global minima.

13. The method of claim 12 wherein making the classification involves considering the coherence of the microphone signal and the echo signal produced by the adaptive filter in frequency domain.

14. The method of claim 12 wherein the adaptive filter in frequency domain is composed of a main filter and an auxiliary filter, the auxiliary filter being utilized in certain predetermined situations wherein the main filter underestimates echo, wherein increasing the adaptation rate involves increasing an adaptation rate of the auxiliary filter to result in an increase in an adaptation rate of the main filter.

15. A method of acoustic echo cancellation (AEC) wherein a microphone signal resulting from an unobservable signal corrupted by both additive background noise and an acoustic echo is processed in an attempt to restore the unobservable signal, the acoustic echo being a speaker signal modified by an acoustic path, wherein an adaptive filter in frequency domain models the echo path, the method including receiving the microphone signal, applying an adaptive filter in sub-bands to the speaker signal to produce an echo signal that models the acoustic echo, subtracting the echo signal from the microphone signal to produce a frequency domain echoless signal that resembles the unobservable signal, and adapting the adaptive filter based on the frequency domain echoless signal, the method further comprising:
applying a residual echo reduction filter to the frequency domain echoless signal;
utilizing state differentiators to make a classification of near-end and far-end speeches to detect a nonlinear relationship between near-end and far-end speeches; and
in the event that a nonlinear relationship is detected, modifying the residual echo reduction filter to provide additional attenuation to the residual echo relative to the extent of attenuation provided in the absence of nonlinearity.

16. The method of claim 15 wherein the classification involves considering the coherence of the microphone signal and the echo signal produced by the adaptive filter in frequency domain.

17. The method of claim 16 wherein a gain constant applied to the residual echo reduction filter reflects an average gain that has a relationship to the coherence of the microphone signal and the echo signal produced by the adaptive filter in frequency domain.

18. The method of claim 16 wherein the classification further involves considering the expected coherence of the microphone signal and the frequency domain echoless signal.

19. The method of claim 18 wherein the classification is based on a difference between average values of the microphone signal/echo signal coherence and the microphone signal/frequency domain echoless signal expected coherence.

20. The method of claim 19 further comprising:
determining a threshold; and
when the determined difference between average values is less than the threshold, indicating significant nonlinearity, applying a frequency dependent nonlinear attenuation vector to a defined group of frequency bands.

21. A method of acoustic echo cancellation (AEC) wherein a microphone signal resulting from an unobservable signal corrupted by both additive background noise and an acoustic echo is processed in an attempt to restore the unobservable signal, the acoustic echo being a speaker signal modified by an acoustic path, wherein an adaptive filter models the echo path, the method including receiving the microphone signal, applying an adaptive filter to the speaker signal to produce an echo signal that models the acoustic echo, subtracting the echo signal from the microphone signal to produce a first echoless signal that resembles the unobservable signal, and adapting the adaptive filter based on the first echoless signal, the method further comprising:
prior to the input of the adaptive filter, a nonlinear compensation scaled by volume information of the system, is applied to the input signal to produce a new input of the adaptive filter and the speaker signal, whereby this dynamic nonlinear pre-distortation allows the system to be treated as a linear system.

22. The method of claim 21 wherein volume adjustments are made prior to applying the nonlinear compensation.

23. The method of claim 22 wherein the applied nonlinear compensation is a hard clip.

24. The method of claim 22 wherein the applied nonlinear compensation is a soft clip.

* * * * *